United States Patent
Roessle et al.

(10) Patent No.: US 9,404,551 B2
(45) Date of Patent: Aug. 2, 2016

(54) ROD GUIDE ASSEMBLY WITH MULTI-PIECE VALVE ASSEMBLY

(71) Applicant: Tenneco Automotive Operating Company Inc., Lake Forest, IL (US)

(72) Inventors: Matthew L. Roessle, Temperance, MI (US); Scott S. Dunaway, Carleton, MI (US); David R. Blankenship, Canton, MI (US); Jeffrey T. Gardner, Woodland Park, CO (US)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 0 days.

(21) Appl. No.: 14/211,318

(22) Filed: Mar. 14, 2014

(65) Prior Publication Data
US 2014/0262648 A1    Sep. 18, 2014

Related U.S. Application Data

(60) Provisional application No. 61/787,004, filed on Mar. 15, 2013, provisional application No. 61/787,169, filed on Mar. 15, 2013.

(51) Int. Cl.
*F16F 9/34* (2006.01)
*F16F 9/46* (2006.01)
*F16F 9/32* (2006.01)

(52) U.S. Cl.
CPC ............. *F16F 9/464* (2013.01); *F16F 9/325* (2013.01)

(58) Field of Classification Search
CPC .............. F16F 9/34; F16F 9/342; F16F 9/36; F16F 9/362; F16F 9/364; F16F 9/464; F16F 9/325
USPC ........ 188/297, 313, 314, 315, 322.13, 322.17
See application file for complete search history.

(56) References Cited

U.S. PATENT DOCUMENTS

| | | | |
|---|---|---|---|
| 3,945,474 A | 3/1976 | Palmer | |
| 4,552,324 A | 11/1985 | Hrusch | |

(Continued)

FOREIGN PATENT DOCUMENTS

| | | | |
|---|---|---|---|
| DE | 3928343 A1 | 2/1991 | |
| DE | 19853277 C1 | 5/2000 | |

(Continued)

OTHER PUBLICATIONS

International Search Report from corresponding PCT Application No. PCT/US2010/049813 dated Jun. 24, 2011.

(Continued)

*Primary Examiner* — Robert A Siconolfi
*Assistant Examiner* — Vu Q Nguyen
(74) *Attorney, Agent, or Firm* — Harness, Dickey & Pierce, P.L.C.

(57) ABSTRACT

A shock absorber may include a piston rod, a first rod guide member, a second rod guide member, and an electronically controlled valve assembly. The first rod guide member is concentrically disposed about the piston rod, and the second rod guide member is concentrically disposed about the piston rod and is adjacent the first rod guide member. The electronically controlled valve assembly may include a coil assembly and a valve guide assembly. The valve guide assembly may be disposed adjacent to the coil assembly and may be concentrically disposed about the second rod guide member. The valve guide assembly includes a spool and defines a valve inlet, a valve outlet, and a chamber. The spool is disposed within the chamber and controls the flow of fluid between the valve inlet and the valve outlet.

9 Claims, 16 Drawing Sheets

(56) References Cited

U.S. PATENT DOCUMENTS

| | | |
|---|---|---|
| 4,589,528 A | 5/1986 | Axthammer et al. |
| 4,749,070 A | 6/1988 | Moser et al. |
| 4,788,489 A | 11/1988 | Kobayashi et al. |
| 4,846,317 A | 7/1989 | Hudgens |
| 4,850,460 A | 7/1989 | Knecht et al. |
| 4,867,476 A | 9/1989 | Yamanaka et al. |
| 4,872,537 A | 10/1989 | Warner |
| 4,892,328 A | 1/1990 | Kurtzman et al. |
| 4,909,536 A | 3/1990 | Hale |
| 4,958,706 A | 9/1990 | Richardson et al. |
| 4,969,662 A | 11/1990 | Stuart |
| 4,973,854 A | 11/1990 | Hummel |
| 4,986,393 A | 1/1991 | Preukschat et al. |
| 5,038,613 A | 8/1991 | Takenaka et al. |
| 5,133,434 A | 7/1992 | Kikushima et al. |
| 5,143,185 A | 9/1992 | Klein et al. |
| 5,154,442 A | 10/1992 | Milliken |
| 5,189,614 A | 2/1993 | Mitsuoka et al. |
| 5,200,895 A | 4/1993 | Emura et al. |
| 5,293,968 A | 3/1994 | Schuelke et al. |
| 5,299,488 A | 4/1994 | Kadlicko et al. |
| 5,350,187 A | 9/1994 | Shinozaki |
| 5,350,983 A | 9/1994 | Miller et al. |
| 5,360,089 A | 11/1994 | Nakamura et al. |
| 5,363,945 A | 11/1994 | Lizell et al. |
| 5,383,679 A | 1/1995 | Nakamura et al. |
| 5,396,973 A | 3/1995 | Schwemmer et al. |
| 5,404,973 A | 4/1995 | Katoh et al. |
| 5,430,648 A | 7/1995 | Sasaki |
| 5,485,417 A | 1/1996 | Wolf et al. |
| 5,487,455 A | 1/1996 | Feigel |
| 5,497,325 A | 3/1996 | Mine |
| 5,497,862 A | 3/1996 | Hoya |
| 5,532,921 A | 7/1996 | Katsuda |
| 5,570,762 A | 11/1996 | Jentsch et al. |
| 5,579,876 A * | 12/1996 | Adrian et al. ............ 188/322.17 |
| 5,597,054 A | 1/1997 | Nagai et al. |
| 5,632,503 A | 5/1997 | Raad et al. |
| 5,653,315 A | 8/1997 | Ekquist et al. |
| 5,655,633 A | 8/1997 | Nakadate et al. |
| 5,690,195 A | 11/1997 | Kruckemeyer et al. |
| 5,725,239 A | 3/1998 | de Molina |
| 5,775,470 A | 7/1998 | Feigel |
| 5,803,482 A | 9/1998 | Kim |
| 5,833,036 A | 11/1998 | Gillespie |
| 5,860,497 A | 1/1999 | Takahashi |
| 5,878,851 A | 3/1999 | Carlson et al. |
| 5,913,391 A | 6/1999 | Jeffries et al. |
| 5,937,976 A | 8/1999 | Grundei |
| 5,950,775 A | 9/1999 | Achmad |
| 5,967,268 A | 10/1999 | de Molina et al. |
| 5,987,369 A | 11/1999 | Kwak et al. |
| 6,003,644 A | 12/1999 | Tanaka |
| 6,036,500 A | 3/2000 | Francis et al. |
| 6,109,400 A | 8/2000 | Ayyildiz et al. |
| 6,155,391 A | 12/2000 | Kashiwagi et al. |
| 6,213,262 B1 | 4/2001 | Bell |
| 6,273,224 B1 | 8/2001 | Achmad |
| 6,296,091 B1 | 10/2001 | Hamilton |
| 6,302,248 B1 | 10/2001 | Nakadate |
| 6,321,888 B1 | 11/2001 | Reybrouck et al. |
| 6,343,677 B2 | 2/2002 | Bell |
| 6,427,986 B1 | 8/2002 | Sakai et al. |
| 6,460,664 B1 | 10/2002 | Steed et al. |
| 6,533,294 B1 | 3/2003 | Germain et al. |
| 6,588,726 B2 | 7/2003 | Osterhart et al. |
| 6,616,124 B2 | 9/2003 | Oliver et al. |
| 6,651,787 B2 | 11/2003 | Grundei |
| 6,655,512 B2 | 12/2003 | Moradmand et al. |
| 6,672,436 B1 | 1/2004 | Keil et al. |
| 6,708,803 B2 | 3/2004 | Jensen |
| 6,814,193 B2 | 11/2004 | Grundei |
| 6,851,528 B2 | 2/2005 | Lemieux |
| 6,879,898 B2 | 4/2005 | Ghoneim et al. |
| 6,904,344 B2 | 6/2005 | LaPlante et al. |
| 6,959,797 B2 | 11/2005 | Mintgen et al. |
| 6,964,325 B2 | 11/2005 | Maes |
| 6,978,872 B2 | 12/2005 | Turner |
| 7,032,912 B2 | 4/2006 | Nicot et al. |
| 7,168,709 B2 | 1/2007 | Niwa et al. |
| 7,234,574 B2 | 6/2007 | Matsunaga et al. |
| 7,234,707 B2 | 6/2007 | Green et al. |
| 7,273,138 B2 | 9/2007 | Park |
| 7,286,919 B2 | 10/2007 | Nordgren et al. |
| 7,318,595 B2 | 1/2008 | Lamela et al. |
| 7,347,307 B2 | 3/2008 | Joly |
| 7,374,028 B2 | 5/2008 | Fox |
| 7,389,994 B2 | 6/2008 | Trudeau et al. |
| 7,413,062 B2 | 8/2008 | Vandewal |
| 7,416,189 B2 | 8/2008 | Wilde et al. |
| 7,475,538 B2 | 1/2009 | Bishop |
| 7,493,995 B2 | 2/2009 | Sas et al. |
| 7,604,101 B2 | 10/2009 | Park |
| 7,611,000 B2 | 11/2009 | Naito |
| 7,628,253 B2 | 12/2009 | Jin et al. |
| 7,644,933 B2 | 1/2010 | Brookes et al. |
| 7,654,369 B2 | 2/2010 | Murray et al. |
| 7,654,370 B2 | 2/2010 | Cubalchini, Jr. |
| 7,680,573 B2 | 3/2010 | Ogawa |
| 7,722,405 B2 | 5/2010 | Jaklin et al. |
| 7,770,983 B2 | 8/2010 | Park |
| 7,775,333 B2 | 8/2010 | Or et al. |
| 7,849,983 B2 | 12/2010 | St. Clair et al. |
| 7,878,311 B2 | 2/2011 | Van Weelden et al. |
| 7,896,311 B2 | 3/2011 | Jee |
| 7,912,603 B2 | 3/2011 | Stiller et al. |
| 7,926,513 B2 | 4/2011 | Ishibashi et al. |
| 7,931,282 B2 | 4/2011 | Kolp et al. |
| 7,942,248 B2 | 5/2011 | St. Clair et al. |
| 7,946,163 B2 | 5/2011 | Gartner |
| 7,946,399 B2 | 5/2011 | Masamura |
| 7,967,116 B2 | 6/2011 | Boerschig |
| 7,967,117 B2 | 6/2011 | Abe |
| 7,992,692 B2 | 8/2011 | Lee et al. |
| 7,997,394 B2 | 8/2011 | Yamaguchi |
| 8,056,392 B2 | 11/2011 | Ryan et al. |
| 8,075,002 B1 | 12/2011 | Pionke et al. |
| 8,116,939 B2 | 2/2012 | Kajino et al. |
| 8,132,654 B2 | 3/2012 | Widla et al. |
| 8,136,644 B2 | 3/2012 | Sonsterod |
| 8,160,774 B2 | 4/2012 | Li et al. |
| 8,214,106 B2 | 7/2012 | Ghoneim et al. |
| 8,267,382 B2 | 9/2012 | Yazaki et al. |
| 8,393,446 B2 | 3/2013 | Haugen |
| 8,430,217 B2 | 4/2013 | Hennecke et al. |
| 8,567,575 B2 | 10/2013 | Jung et al. |
| 8,616,351 B2 | 12/2013 | Roessle et al. |
| 8,666,596 B2 | 3/2014 | Arenz |
| 8,684,367 B2 | 4/2014 | Haugen |
| 8,695,766 B2 | 4/2014 | Yamashita et al. |
| 8,794,405 B2 | 8/2014 | Yamashita et al. |
| 8,844,687 B2 | 9/2014 | Yu et al. |
| 2002/0133277 A1 | 9/2002 | Koh |
| 2003/0164193 A1 | 9/2003 | Lou |
| 2003/0192755 A1 | 10/2003 | Barbison et al. |
| 2004/0090020 A1 | 5/2004 | Braswell |
| 2004/0199313 A1 | 10/2004 | Dellinger |
| 2005/0029063 A1 | 2/2005 | Neumann |
| 2005/0056502 A1 | 3/2005 | Maes |
| 2005/0085969 A1 | 4/2005 | Kim |
| 2005/0113997 A1 | 5/2005 | Kim |
| 2005/0173849 A1 | 8/2005 | Vandewal |
| 2006/0038149 A1* | 2/2006 | Albert ..................... F16F 9/461<br>251/129.01 |
| 2006/0124415 A1 | 6/2006 | Joly |
| 2006/0219503 A1 | 10/2006 | Kim |
| 2007/0034466 A1 | 2/2007 | Paesmans et al. |
| 2007/0051574 A1 | 3/2007 | Keil et al. |
| 2008/0054537 A1 | 3/2008 | Harrison |
| 2008/0243336 A1 | 10/2008 | Fitzgibbons |
| 2008/0250844 A1 | 10/2008 | Gartner |
| 2008/0277218 A1 | 11/2008 | Fox |
| 2009/0078517 A1 | 3/2009 | Maneyama et al. |
| 2009/0084647 A1 | 4/2009 | Maneyama et al. |

(56) References Cited

U.S. PATENT DOCUMENTS

| | | |
|---|---|---|
| 2009/0132122 A1 | 5/2009 | Kim et al. |
| 2009/0192673 A1 | 7/2009 | Song et al. |
| 2010/0001217 A1 | 1/2010 | Jee et al. |
| 2010/0044172 A1 | 2/2010 | Jee et al. |
| 2010/0066051 A1 | 3/2010 | Haugen |
| 2010/0163354 A1 | 7/2010 | Braun |
| 2010/0181154 A1 | 7/2010 | Panichgasem |
| 2010/0191420 A1 | 7/2010 | Honma et al. |
| 2010/0211253 A1 | 8/2010 | Morais Dos Santos et al. |
| 2011/0035091 A1 | 2/2011 | Yamamoto |
| 2011/0056780 A1 | 3/2011 | St.Clair et al. |
| 2011/0056783 A1 | 3/2011 | Teraoka et al. |
| 2011/0079475 A1 | 4/2011 | Roessle et al. |
| 2011/0101579 A1 | 5/2011 | Polakowski et al. |
| 2011/0198172 A1 | 8/2011 | Whan |
| 2011/0240424 A1 | 10/2011 | Beck |
| 2011/0298399 A1 | 12/2011 | Ogawa et al. |
| 2012/0018263 A1 | 1/2012 | Marking |
| 2012/0048665 A1 | 3/2012 | Marking |
| 2012/0181126 A1 | 7/2012 | de Kock |
| 2012/0186922 A1 | 7/2012 | Battlogg et al. |
| 2012/0228072 A1 | 9/2012 | Mangelschots et al. |
| 2013/0090808 A1 | 4/2013 | Lemme et al. |
| 2013/0234379 A1 | 9/2013 | Panichgasem |
| 2013/0313057 A1 | 11/2013 | Tsukahara et al. |
| 2013/0328277 A1 | 12/2013 | Ryan et al. |
| 2013/0340865 A1 | 12/2013 | Manger et al. |
| 2013/0341842 A1 | 12/2013 | Weber |
| 2014/0102842 A1 | 4/2014 | Roessle et al. |
| 2014/0125018 A1 | 5/2014 | Brady et al. |
| 2014/0202808 A1 | 7/2014 | Spyche, Jr. et al. |
| 2014/0231200 A1 | 8/2014 | Katayama |
| 2014/0238797 A1 | 8/2014 | Blankenship et al. |
| 2014/0239602 A1 | 8/2014 | Blankenship et al. |
| 2014/0244112 A1 | 8/2014 | Dunaway et al. |

FOREIGN PATENT DOCUMENTS

| | | |
|---|---|---|
| DE | 10238657 A1 | 3/2004 |
| EP | 1588072 A1 | 10/2005 |
| EP | 1746302 A1 | 1/2007 |
| GB | 2 123 922 | 2/1984 |
| JP | 61125907 | 6/1986 |
| JP | 62-253506 | 11/1987 |
| JP | 06-026546 | 2/1994 |
| JP | 07-113434 | 5/1995 |
| JP | 7056311 | 6/1995 |
| JP | 08-260747 | 10/1996 |
| JP | 09-217779 | 8/1997 |
| JP | 2002-349630 | 12/2002 |
| WO | 9218788 A1 | 10/1992 |

OTHER PUBLICATIONS

Search Report and Written Opinion dated Jul. 7, 2014 in corresponding PCT Application No. PCT/US2014/028386 (10 pages).

\* cited by examiner

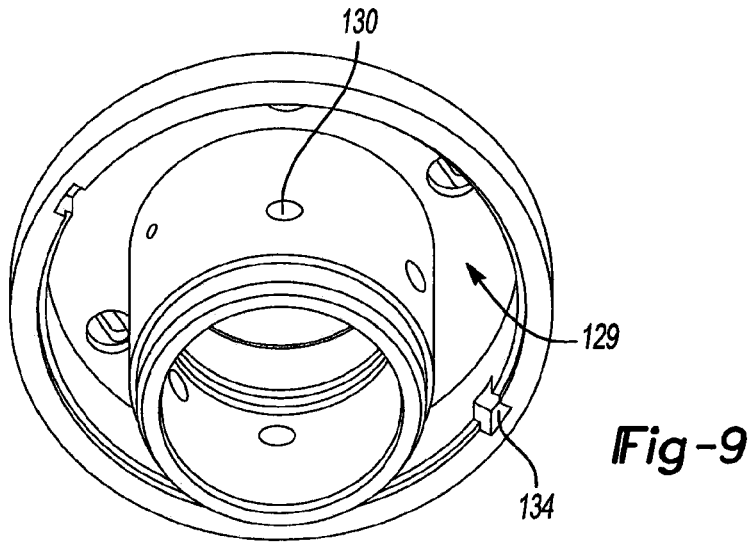
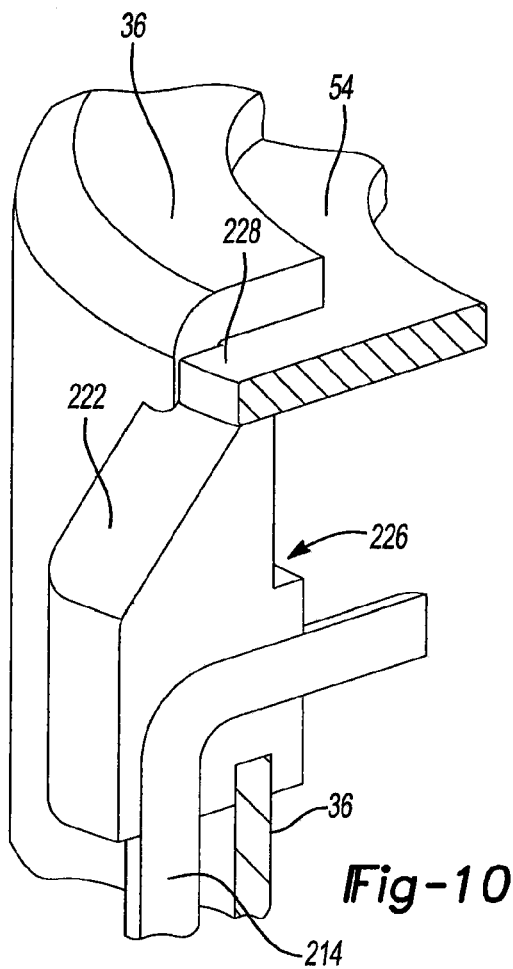
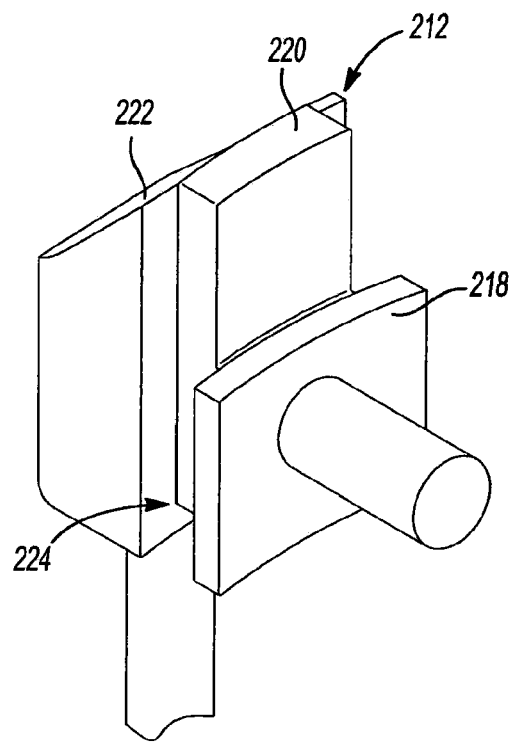

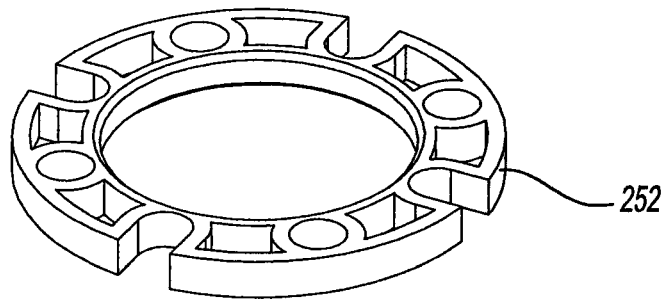
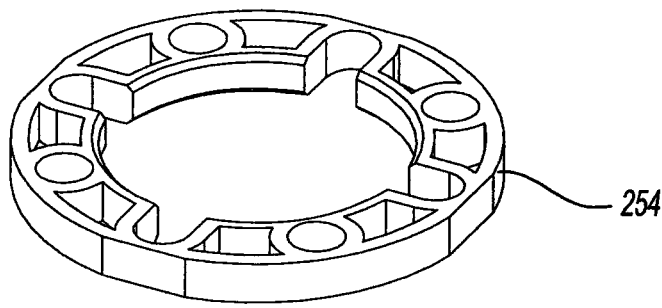
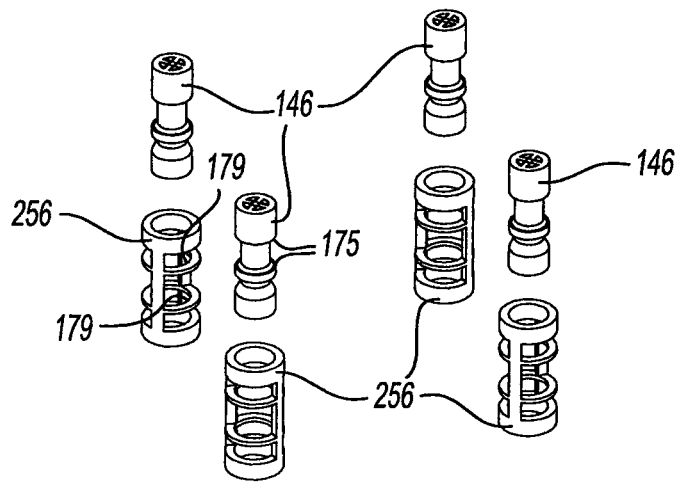
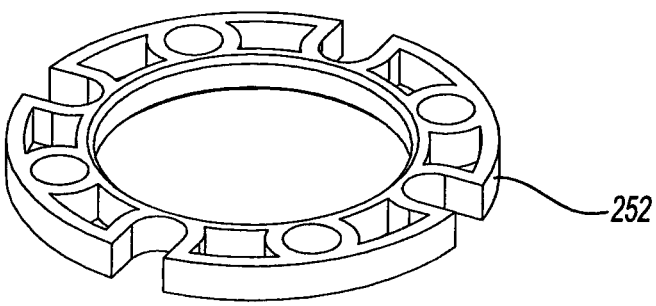
Fig-13B

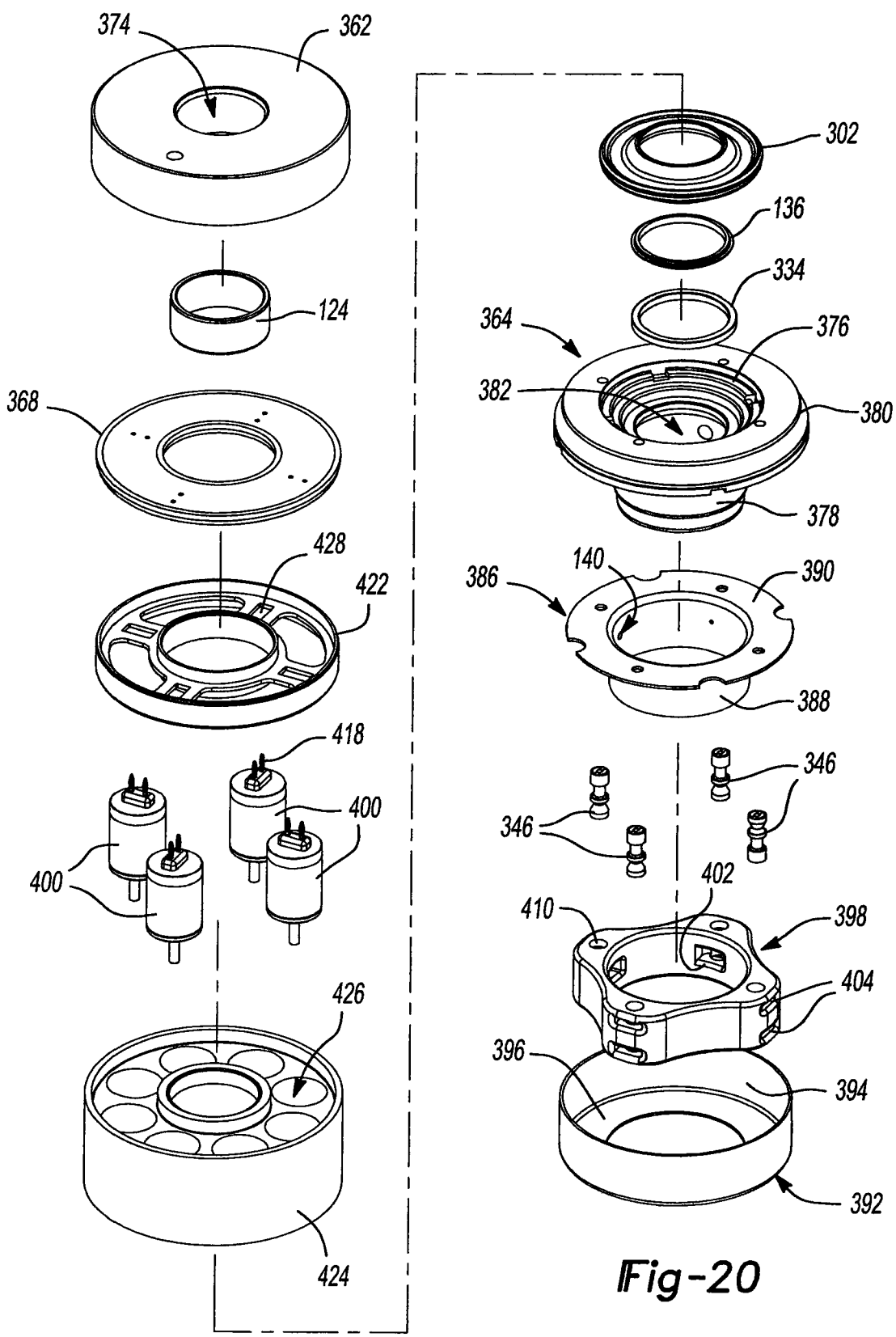

ROD GUIDE ASSEMBLY WITH MULTI-PIECE VALVE ASSEMBLY

CROSS-REFERENCE TO RELATED APPLICATIONS

This application claims the benefit of U.S. Provisional Application No. 61/787,004, filed on Mar. 15, 2013 and U.S. Provisional Application No. 61/787,169, filed on Mar. 15, 2013. The entire disclosure of the above applications are incorporated herein by reference.

FIELD

The present disclosure relates generally to hydraulic dampers or shock absorbers for use in a suspension system such as a suspension system used for automotive vehicles. More particularly, the present disclosure relates to a rod guide assembly for a shock absorber.

BACKGROUND

This section provides background information related to the present disclosure which is not necessarily prior art.

Shock absorbers are used in conjunction with automotive suspension systems to absorb unwanted vibrations that occur during driving. To absorb the unwanted vibrations, shock absorbers are generally connected between the sprung portion (body) and the unsprung portion (suspension) of the automobile. A piston is located within a pressure tube of the shock absorber and the pressure tube is connected to the unsprung portion of the vehicle. The piston is connected to the sprung portion of the automobile through a piston rod that extends through the pressure tube. The piston divides the pressure tube into an upper working chamber and a lower working chamber both of which are filled with hydraulic fluid. Through valving, the piston is able to limit the flow of the hydraulic fluid between the upper and the lower working chambers when the shock absorber is compressed or extended, to thereby produce a damping force which counteracts the vibration which would otherwise be transmitted from the unsprung portion to the sprung portion of the vehicle. In a dual-tube shock absorber, a fluid reservoir or reserve chamber is defined between the pressure tube and a reserve tube. A base valve is located between the lower working chamber and the reserve chamber to also produce a damping force which counteracts the vibrations which would otherwise be transmitted from the unsprung portion of the vehicle to the sprung portion of the automobile.

As described above, for a dual-tube shock absorber, the valving on the piston limits the flow of damping fluid between the upper and lower working chambers when the shock absorber is extended to produce a damping load. The valving on the base valve limits the flow of damping fluid between the lower working chamber and the reserve chamber when the shock absorber is compressed to produce a damping load. In a mono-tube shock absorber, the valving on the piston limits the flow of damping fluid between the upper and lower working chambers when the shock absorber is extended or compressed to produce a damping load. As the vehicle travels along the road surface, the suspension system moves in jounce (compression) and rebound (extension). During jounce movements, the shock absorber is compressed causing damping fluid to move through the base valve in a dual-tube shock absorber or through the piston valve in a mono-tube shock absorber. A damping valve located on the base valve or the piston controls the flow of damping fluid and thus the damping force created. During rebound movements, the shock absorber is extended, causing damping fluid to move through the piston in both the dual-tube shock absorber and the mono-tube shock absorber. A damping valve located on the piston controls the flow of damping fluid and thus the damping force created.

In a dual-tube shock absorber, the piston and the base valve normally include a plurality of compression passages and a plurality of extension passages. During jounce or compression movements in a dual-tube shock absorber, the damping valve or the base valve opens the compression passages in the base valve to control fluid flow and produce a damping load. A check valve on the piston opens the compression passages in the piston to replace damping fluid in the upper working chamber but this check valve does not contribute to the damping load. The damping valve on the piston closes the extension passages of the piston and a check valve on the base valve closes the extension passages of the base valve during a compression movement. During rebound or extension movements in a dual-tube shock absorber, the damping valve on the piston opens the extension passages in the piston to control fluid flow and produce a damping load. A check valve on the base valve opens the extension passages in the base valve to replace damping fluid in the lower working chamber but this check valve does not contribute to the damping load.

In a mono-tube shock absorber, the piston normally includes a plurality of compression passages and a plurality of extension passages. The shock absorber will also include means for compensating for the rod volume flow of fluid as is well known in the art. During jounce or compression movements in a mono-tube shock absorber, the compression damping valve on the piston opens the compression passages in the piston to control fluid flow and produce a damping load. The extension damping valve on the piston closes the extension passages of the piston during a jounce movement. During rebound or extension movements in a mono-tube shock absorber, the extension damping valve on the piston opens the extension passages in the piston to control fluid flow and produce a damping load. The compression damping valve on the piston closes the compression passages of the piston during a rebound movement.

For most dampers, the damping valves are designed as a normal open/close valve even though some valves may include a bleed flow of damping fluid. Because of this open/close design, these passive valve systems are limited in their ability to adjust the generated damping load in response to various operating conditions of the vehicle. Accordingly, some valves have been designed to include a bleed flow of damping fluid, such as in Applicant/Assignee's commonly owned U.S. Pat. No. 8,616,351. While this type of design works effectively, it requires high precision components that are manufactured with tight tolerances.

SUMMARY

This section provides a general summary of the disclosure, and is not a comprehensive disclosure of its full scope or all of its features.

The present disclosure provides for a shock absorber. The shock absorber includes a piston rod, a first rod guide member, a second rod guide member, and an electronically controlled valve assembly. The first rod guide member is concentrically disposed about the piston rod. The second rod guide member is concentrically disposed about the piston rod and adjacent the first rod guide member.

The electronically controlled valve assembly includes a coil assembly and a valve guide assembly. The coil assembly may have at least one coil fixedly disposed along an annular member. The valve guide assembly is disposed adjacent to the coil assembly and is concentrically disposed about the second rod guide member. The valve guide assembly includes a spool and defines a valve inlet, a valve outlet, and a chamber. The spool is disposed within the chamber and controls the flow of fluid between the valve inlet and the valve outlet.

The present disclosure further provides for a shock absorber that includes a piston rod, a first rod guide member, a second rod guide member, and an electronically controlled valve assembly. The first rod guide member is concentrically disposed about the piston rod. The second rod guide member is concentrically disposed about the piston rod and is adjacent to the first rod guide member.

The electronically controlled valve assembly includes a solenoid assembly and a valve guide assembly. The solenoid assembly is disposed between the first rod guide member and the second rod guide member. The valve guide assembly includes a spool and is concentrically disposed about the second rod guide member. The valve guide assembly defines a valve inlet, a valve outlet, and a chamber. The spool is disposed within the chamber and abuts with the solenoid assembly. The solenoid assembly controls an axial travel of the spool, and the spool controls the flow of fluid between the valve inlet and the valve outlet.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 9 is an enlarged view of the lower rod guide;

FIGS. 10 and 11 are enlarged views of a wire assembly;

FIGS. 13A and 13B illustrate a valve flow guide having multiple rings and a metering sleeve;

FIG. 20. is an exploded view of the rod guide assembly of FIG. 19.

Corresponding reference numerals indicate corresponding parts throughout the several views of the drawings.

DETAILED DESCRIPTION

Figure 1:
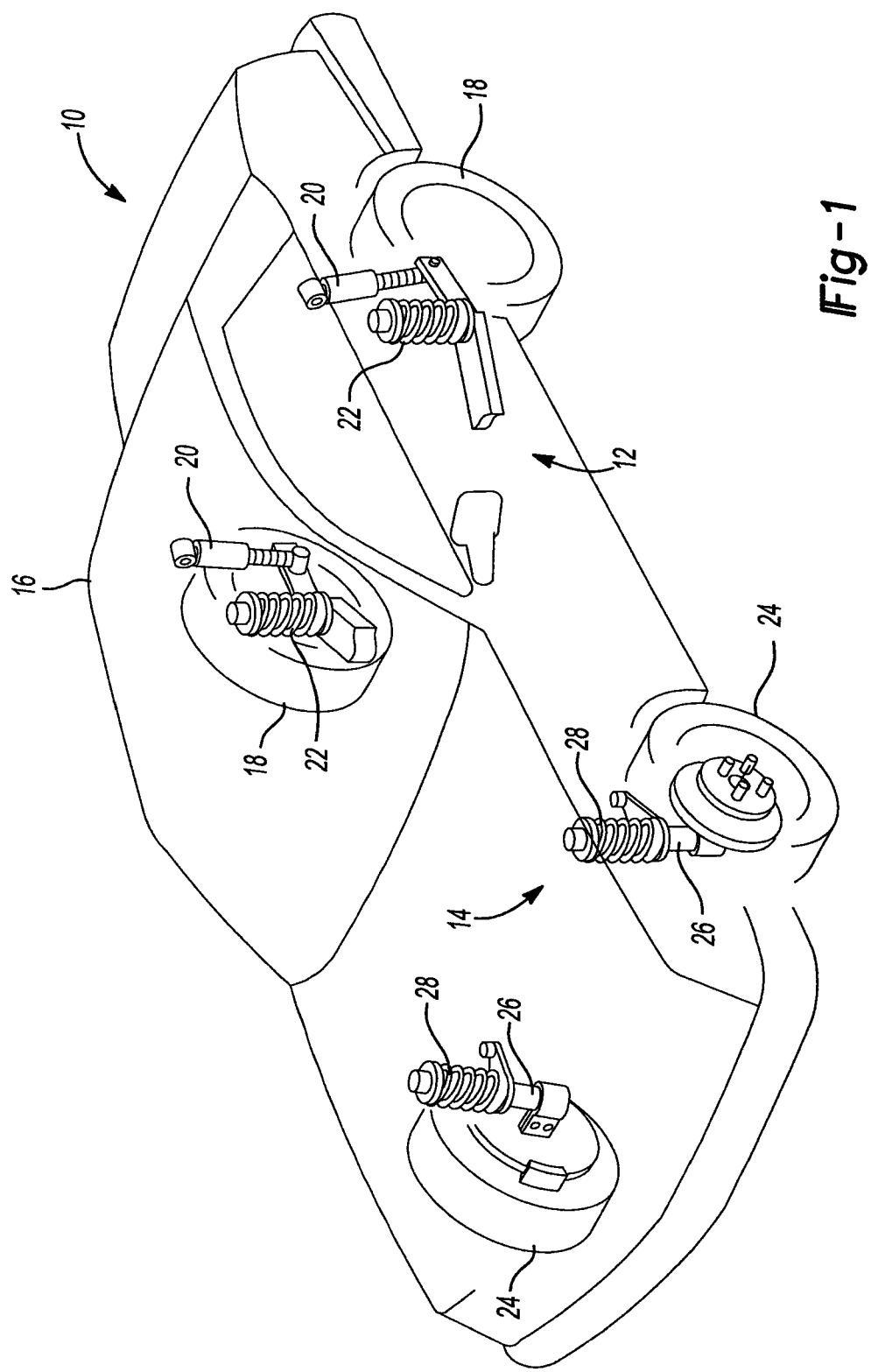
FIG. 1 is an illustration of a vehicle having shock absorbers which incorporate a rod guide assembly in accordance with the present disclosure.

The following description is merely exemplary in nature and is not intended to limit the present disclosure, application, or uses. With reference to FIG. 1, a vehicle 10 incorporating a suspension system having shock absorbers in accordance with the present invention is presented. The vehicle 10 has been depicted as a passenger car having front and rear axle assemblies. However, shock absorbers in accordance with the present invention may be used with other types of vehicles or in other types of applications. Examples of these alternate arrangements include, but are not limited to, vehicles incorporating non-independent front and/or non-independent rear suspensions, vehicles incorporating independent front and/or independent rear suspensions or other suspension systems known in the art. Further, the term "shock absorber" as used herein is meant to refer to dampers in general and thus will include McPherson struts and other damper designs known in the art.

The vehicle 10 includes a rear suspension 12, a front suspension 14, and a body 16. The rear suspension 12 has a transversely extending rear axle assembly (not shown) adapted to operatively support a pair of rear wheels 18. The rear axle is attached to the body 16 by means of a pair of shock absorbers 20 and by a pair of springs 22. Similarly, the front suspension 14 includes a transversely extending front axle assembly (not shown) for operatively supporting a pair of front wheels 24. The front axle assembly is attached to the body 16 by means of a pair of shock absorbers 26 and by a pair of springs 28. Shock absorbers 20, 26 serve to dampen the relative motion of the unsprung portion (i.e., rear and front suspensions 12, 14) with respect to the sprung portion (i.e., body 16) of vehicle 10.

Figure 2:
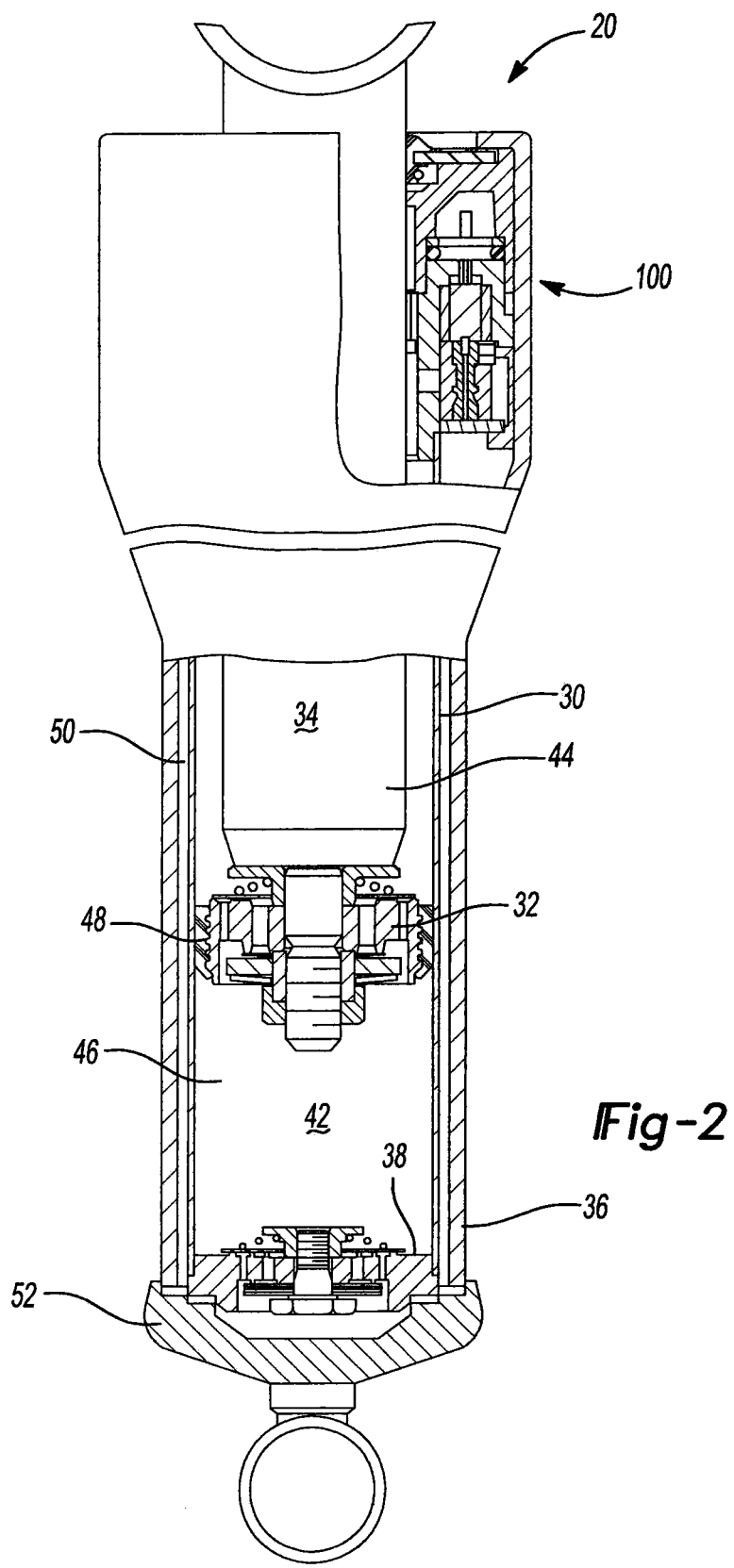
FIG. 2 is partial-cross-sectional view of a shock absorber.

Referring now to FIG. 2, the shock absorber 20 is shown in greater detail. While FIG. 2 illustrates only shock absorber 20, it is to be understood that shock absorber 26 is substantially similar to shock absorber 20. Shock absorber 26 differs from shock absorber 20 only in the manner in which it is adapted to be connected to the sprung and unsprung masses of the vehicle 10. The shock absorber 20 comprises a pressure tube 30, a piston assembly 32, a piston rod 34, a reserve tube 36, a base valve assembly 38, and a rod guide assembly 100.

The pressure tube 30 defines a working chamber 42. The piston assembly 32 is slidably disposed within the pressure tube 30 and divides the working chamber 42 into an upper working chamber 44 and a lower working chamber 46. A seal 48 is disposed between the piston assembly 32 and the pressure tube 30 to permit sliding movement of the piston assembly 32 with respect to the pressure tube 30 without generating undue frictional forces. The seal 48 also works to seal the upper working chamber 44 from the lower working chamber 46.

The piston rod 34 is attached to the piston assembly 32 and extends through the upper working chamber 44 and through the rod guide assembly 100. The end of the piston rod 34 opposite to the piston assembly 32 is adapted to be secured to the sprung mass of the vehicle 10. Valving within the piston assembly 32 controls the movement of fluid between the upper working chamber 44 and the lower working chamber 46 during movement of the piston assembly 32 within the pressure tube 30. Movement of the piston assembly 32 with respect to the pressure tube 30 causes a difference in the amount of fluid displaced in the upper working chamber 44 and the amount of fluid displaced in the lower working chamber 46. This is primarily because the piston rod 34 extends only through the upper working chamber 44 and not through the lower working chamber 46. The difference in the amount of fluid displaced which flows through the base valve assembly 38 is known as the "rod volume".

The reserve tube 36 surrounds the pressure tube 30 to define a fluid reservoir chamber 50 located between tubes 30, 36. The bottom end of the reserve tube 36 is closed by a base cup 52 which is adapted to be connected to the unsprung mass of the vehicle 10. The upper end of the reserve tube 36 may extend to the rod guide assembly 100.

The base valve assembly 38 is disposed between the lower working chamber 46 and the reservoir chamber 50 to control the flow of fluid between chambers 46, 50. When the shock absorber 20 extends in length, an additional volume of fluid is needed in the lower working chamber 46. Thus, fluid will flow from the reservoir chamber 50 to the lower working chamber 46 through the base valve assembly 38. Conversely, when the shock absorber 20 compresses in length (i.e., when the piston rod 34 moves toward the base valve assembly 38), an excess of fluid must be removed from the lower working chamber 46. Thus, fluid will flow from the lower working chamber 46 to the reservoir chamber 50 through the base valve assembly 38.

With reference to FIGS. 3-9, an example of the rod guide assembly 100 is now presented. The rod guide assembly 100 is disposed within the reserve tube 36. A load ring 54 secures the rod guide assembly 100 within the reserve tube 36. The rod guide assembly 100 includes a seal 102, an upper rod guide 104 (i.e., a first rod guide member), a lower rod guide 106 (i.e., a second rod guide member), a valve assembly 108, and printed circuit board (PCB) assembly 112. The valve assembly 108 forms one or more electronically controlled valves 114.

The seal 102 is disposed at an outer surface of the upper rod guide 104. The upper rod guide 104 may have a substantially cylindrical shaped body with a central shaft 116 that defines a central aperture 118. The upper rod guide 104 defines a seal cavity 117 which is concentrically arranged about the central aperture 118 for accommodating the seal 102. An outer wall 120 of the upper rod guide 104 defines a slot 122 which accommodates a wire assembly 123. The upper rod guide 104 may be made of metal.

A bearing 124 is disposed within the central shaft 116 of the upper rod guide 104. More particularly, the bearing 124 may be pressed-fit within the central shaft 116 about the central aperture 118. The bearing 124 supports the sliding motion of the piston rod 34.

Figure 6:
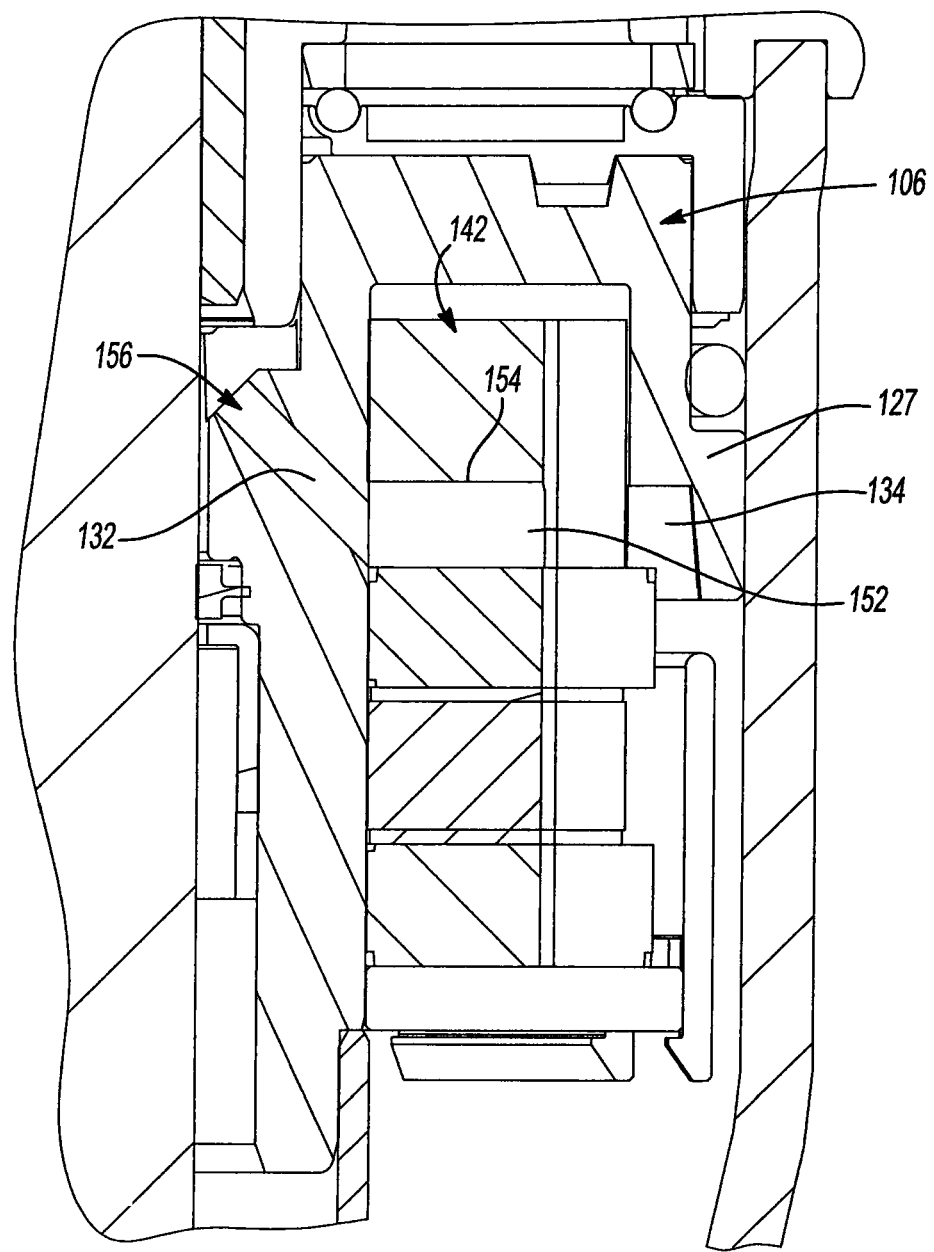
FIG. 6 is an enlarged cross-sectional view of a drain passage of the rod guide assembly of FIG. 5.
Figure 7:
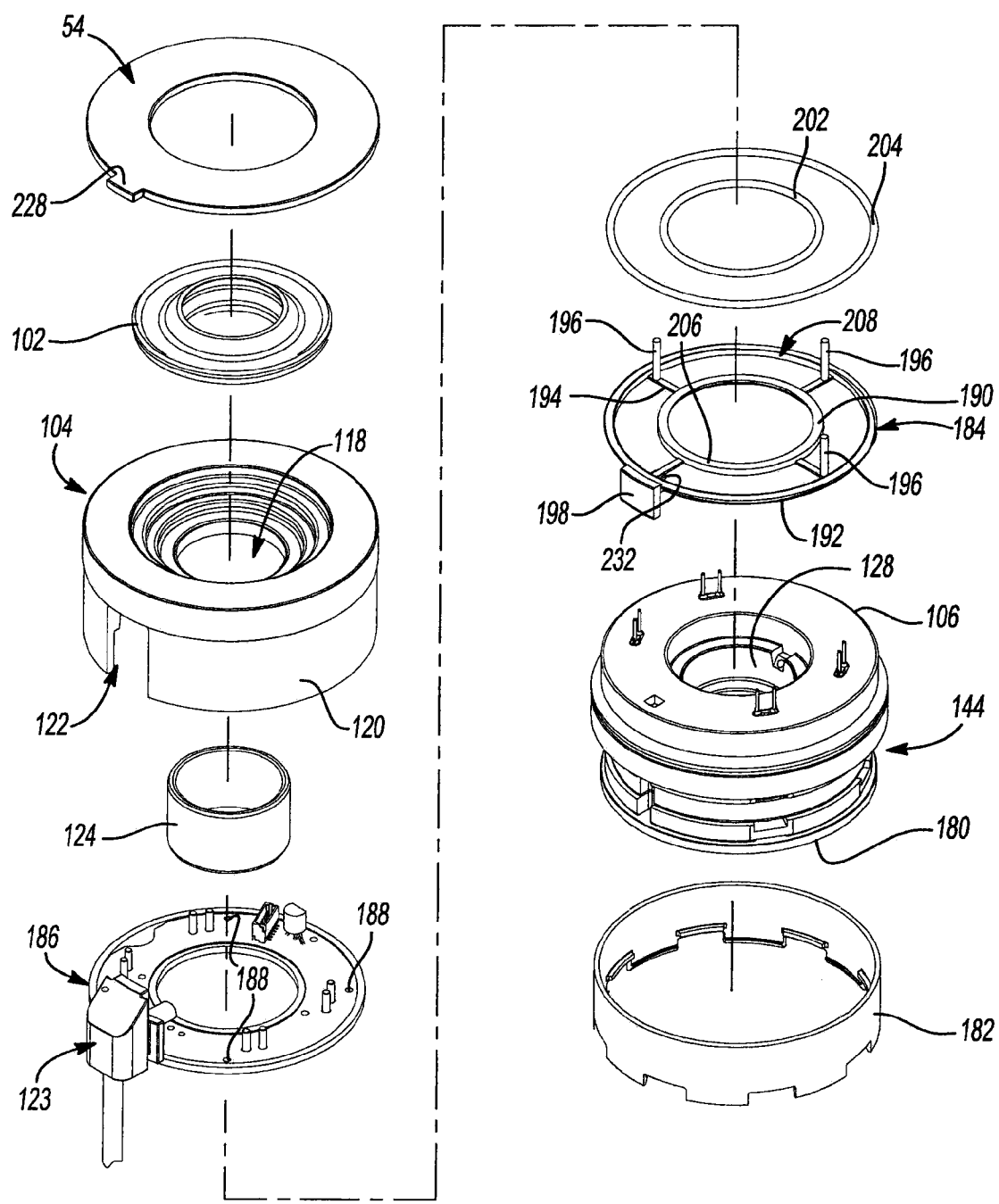
FIG. 7 is an exploded view of the rod guide assembly of FIG. 5.

The lower rod guide 106 may also have a substantially cylindrical shaped body with a central shaft 126 and an outer band 127 extending from the central shaft 126. The outer band 127 and the central shaft 126 define a space 129. The central shaft 126 defines a central aperture 128 which aligns with the central aperture 118 of the upper rod guide 104. The pressure tube 30 is fixedly coupled to the central shaft 126. The central shaft 126 defines a radial port 130. The number of radial ports 130 defined equals the number of electronically controlled valves 114 in the valve assembly 108. The lower rod guide 106 may also define one or more drainback ports 132 at the central shaft 126 and one or more drainback slots 134 defined at the outer band 127 (FIG. 6).

A slip ring 136 and an orifice tube 138 are disposed within the central shaft 126 of the lower rod guide 106. Specifically, the slip ring 136 and the orifice tube 138 may be pressed-fit within the central shaft 126. The orifice tube 138 defines a hole 140 which aligns with the radial port 130 of the lower rod guide 106. Similar to the radial port 130, the number of holes 140 equals the number of electronically controlled valves 114. The holes 140 and the radial ports 130 fluidly couple the electronically controlled valves 114 to the working chamber 42. The holes 140 control the fluid flow rate characteristics of the electronically controlled valves 114. The holes 140 may have different diameters, thereby providing different discrete flow areas. The orifice tube 138 may also have a shoulder or an integral lip which provides a retention feature for the slip ring 136. The orifice tube 138 may be made of metal.

In the example embodiment, the valve assembly 108 has four electronically controlled valves 114. The valve assembly 108 includes a coil assembly 142, a valve flow guide 144, and one or more spools 146. The coil assembly 142 includes one or more coils 148 which are aligned and coupled to each other via an annular body 150. More particularly, in the example embodiment, four coils 148 are individually wound and then aligned relative to one another. Once aligned, the coils 148 may then be molded with a polymer material which forms the annular body 150. A terminal 151 of the coils extend from the annular body 150.

The coil assembly 142 may also include one or more drainback slots 152 defined along a base 154 of the annular body 150. When assembled, the drainback slots 152 along the coil assembly 142 and the drainback ports 132 and the drain back slots 134 defined on the lower rod guide 106 align to form a drainback passage 156 (FIG. 6). The drainback passage 156 forms a flow path between a chamber formed between the seal 102 and the slip ring 136 to the reservoir chamber 50 of the shock absorber 20. Accordingly, the drainback passage 156 prevents hydraulic fluid from accumulating between the seal 102 and the slip ring 136.

The coil assembly 142 is arranged within the space 129 defined by the lower rod guide 106. More particularly, the terminal 151 of each of the coils 148 extends through a terminal slot 158 defined by the lower rod guide 106. An o-ring 160 may be disposed between the lower rod guide 106 and the annular body 150 for each terminal 151 of the coil assembly 142.

Figure 5:
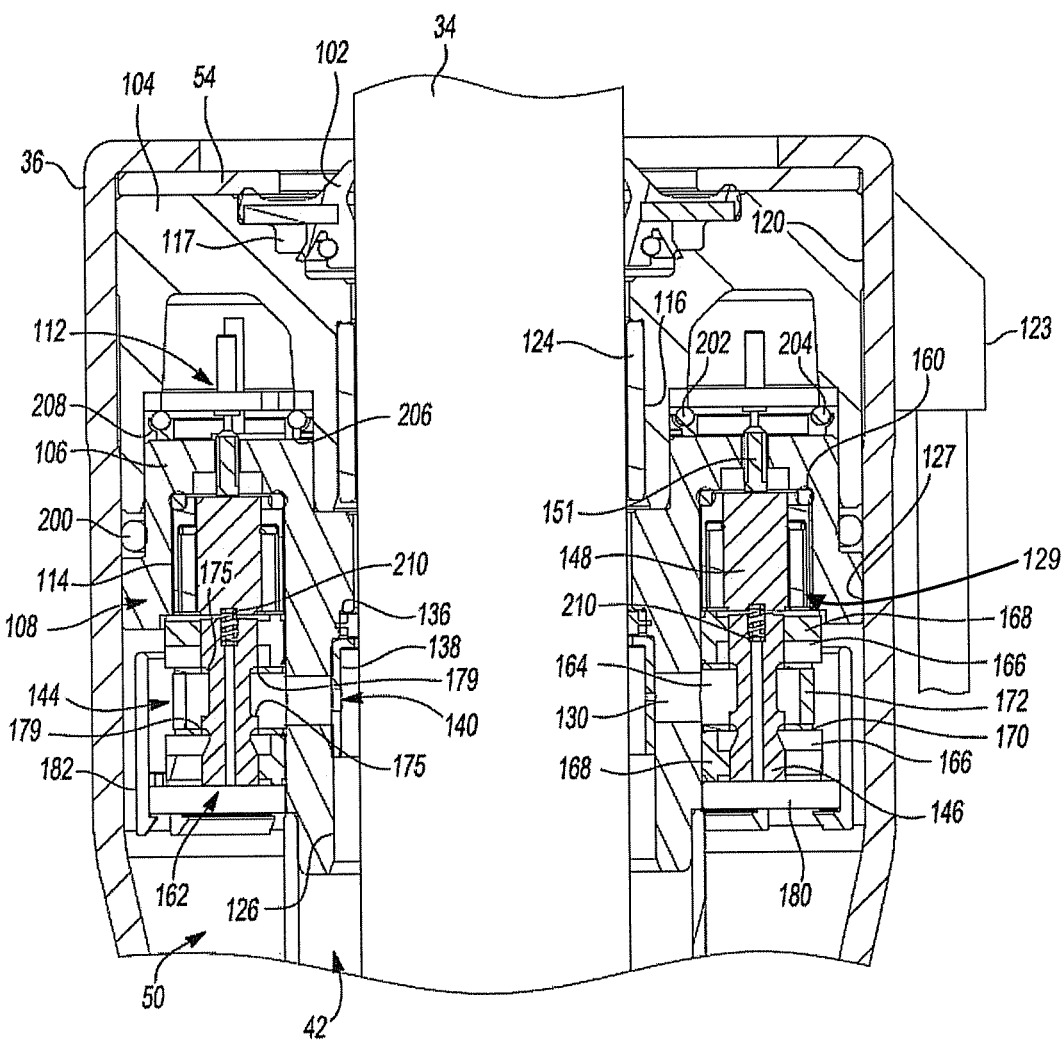
FIG. 5 is an enlarged cross-sectional view of a first example of a rod guide assembly for the shock absorber.
Figure 8:
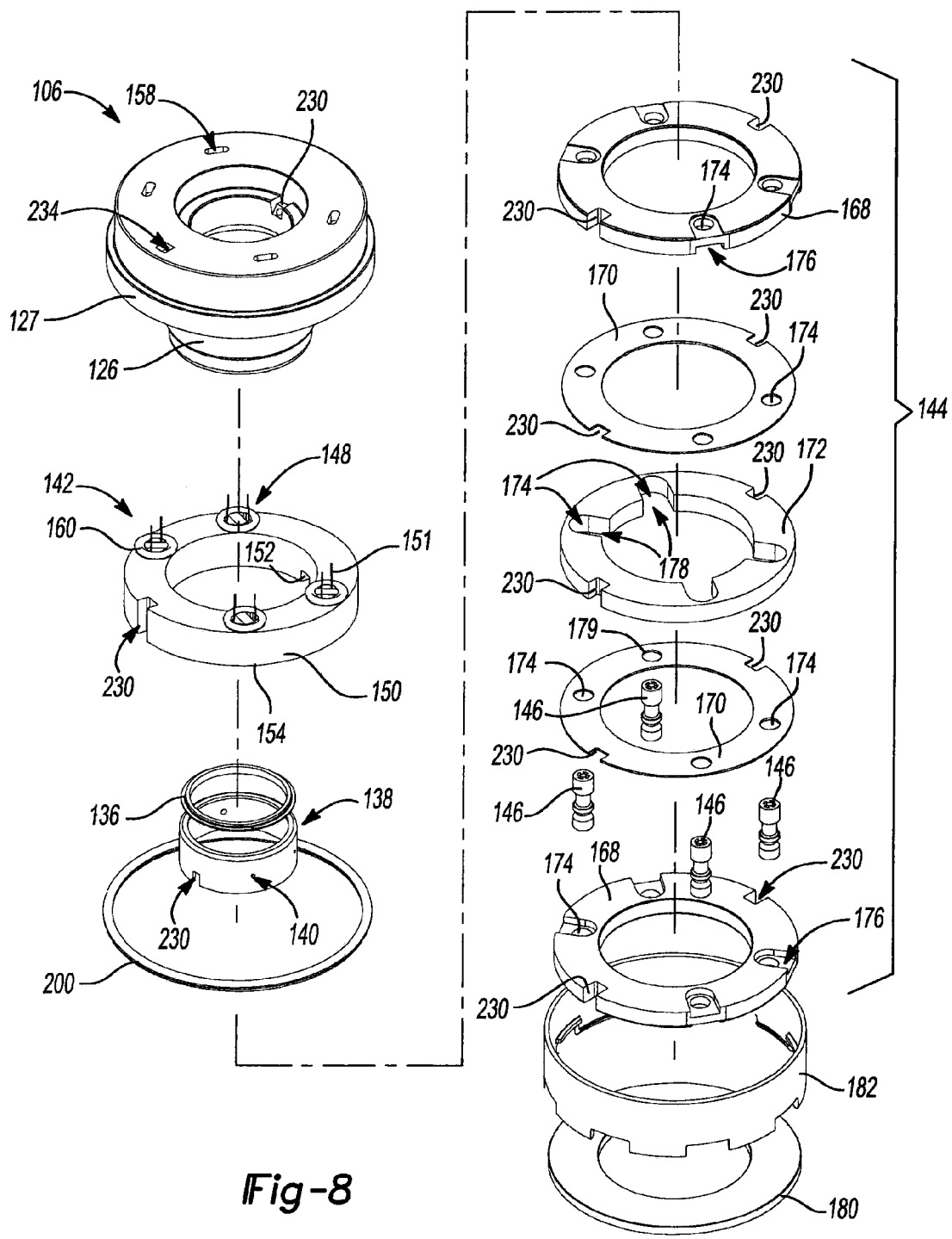
FIG. 8 is an exploded view of a lower rod guide and valve assembly of the rod guide assembly of FIG. 5.

The valve flow guide 144 defines a spool chamber 162, a valve inlet 164, and valve outlet 166. More particularly, the valve flow guide 144 includes at least two valve outlet rings 168, at least two metering rings 170, and a valve inlet ring 172 (FIGS. 5 and 8). Each of the rings 168, 170, 172 defines a spool hole 174. The valve outlet rings 168 define an outlet port 176, and the valve inlet ring 172 defines an inlet port 178. The metering rings 170 have metering edges 179 that align with metering lands 175 of the spool 146 to control the fluid flow in the open/closed valve positions (FIG. 5). The rings 168, 170, 172 are stacked in the following order: one valve outlet ring 168, one metering ring 170, the valve inlet ring 172, one metering ring 170, and one valve outlet ring 168. When stacked, the spool holes 174 defined by each ring 168, 170, 172 align to form the spool chamber 162. Similarly, the inlet port 178 forms the valve inlet 164 and the outlet ports 176 form the valve outlet 166.

In the example embodiment, the metering rings 170 are separate from the valve outlet rings 168 and the valve inlet ring 172. Alternatively, the metering rings 170 may be integral with or coupled with the valve outlet ring 168 and/or the valve inlet ring 172. Specifically, the metering land 179 may be provided with the valve outlet rings 168 and/or the valve inlet rings 172. For example, one metering ring 170 may be fixed to one of the valve outlet rings 168 and the other metering ring 170 may be fixed to the valve inlet ring 172, such that the metering rings 170 are between the valve inlet ring 172 and the valve outlet rings 168.

By way of another example, both metering rings 170 may be fixed to the valve inlet rings 172, such that one metering ring 170 is disposed on a first side of the valve inlet ring 172 and the other ring 170 is disposed on a second side opposite the first side of the valve inlet ring 172. By having the metering rings 170 integral with the valve outlet rings 168 and/or valve inlet rings 172, the rings 168, 172 would be stacked in the following order: one valve outlet ring 168, the valve inlet ring 172, and the other valve outlet ring 168.

As another variation, in lieu of coupling the metering ring with the valve outlet ring and/or valve inlet ring, the valve outlet ring and/or the valve inlet ring may be configured to include a metering edge which aligns with a metering land of the spool. Thus, the valve flow guide may be a multiple piece assembly which forms the valve inlet, the valve outlets, and provides a metering edge for the spools.

The valve flow guide 144 defines the spool chamber 162, the valve inlet 164, and the valve outlet 166 for each of the electronically controlled valves 114 of the valve assembly 108. Accordingly, in the example embodiment, each of the rings 168, 170, 172 defines four spool holes 174, each of the valve outlet rings 168 define four outlet ports 176, and the valve inlet ring 172 defines four inlet ports 178.

The valve flow guide 144 and a stop plate 180 are arranged around the central shaft 126 of the lower rod guide 106. The stop plate 180 is positioned below the valve flow guide 144 and forms the bottom surface of the valve flow guide 144. The stop plate 180 further retains the spool 146, such that the spool 146 travels axially within the spool chamber 162 between the coil assembly 142 and the stop plate 180.

An outlet reservoir 182 is arranged around the central shaft 126 of the lower rod guide 106 and is retained to the lower rod guide 106 by the stop plate 180. The outlet reservoir 182 extends substantially up to and around the valve flow guide 144. Specifically, the outlet reservoir 182 may extend substantially to the valve outlet ring 168 closest to the coil assembly 142. The outlet reservoir 182 maintains a volume of hydraulic fluid around the valve flow guide 144. The level of fluid contained by the outlet reservoir 182 is above the valve outlet 166 of the electronically controlled valve 114, thereby ensuring that the valve outlet 166 and the valve inlet 164 are in direct fluid communication which prevents aeration. The outlet reservoir 182 maintains the proper fluid level and allows any additional fluid volume to be returned to the reservoir chamber 50 of the shock absorber 20. The outlet reservoir 182 and the stop plate 180 may be made of plastic or metal.

The PCB assembly 112 is disposed between the upper rod guide 104 and the lower rod guide 106. The PCB assembly 112 is aligned to receive the terminals 151 of the coil assembly 142. The PCB assembly 112 includes a PCB locator 184, the wire assembly 123, and a PCB 186. The PCB 186 has an annular shape and defines one or more holes 188. The PCB further includes the wire assembly 123 which is fixedly coupled to the PCB 186.

The PCB locator 184 has a first ring 190 and a second ring 192 which are radially coupled via one or more stems 194. The first ring 190 has a smaller diameter than the second ring 192. The PCB locator 184 may include one or more alignment pins 196 which align with the holes 188 on the PCB 186. The alignment pin 196 and the holes 188 define the correct orientation of the PCB 186. The PCB locator 184 may also include a guide tab 198 provided along the second ring 192. The guide tab 198 aids in the alignment of the PCB assembly 112 with the slot 122 of the upper rod guide 104. The guide tab 198 may also form a support surface for an outer o-ring 200 disposed along an outer surface of the lower rod guide 106.

Two o-rings 202, 204 are disposed between the PCB 186 and the PCB locator 184. More particularly, the first ring 190 of the PCB locator 184 may define an inner groove 206 and the second ring 192 may define an outer groove 208. One o-ring 202 is positioned at the inner groove 206 and the other o-ring 204 is positioned at the outer groove 208. The PCB 186 is disposed on top of the PCB locator 184 with the o-rings 202, 204 disposed between the PCB locator 184 and the PCB 186. The o-rings 202, 204 isolate the PCB 186 from vibrations, and the o-rings 202, 204 and the grooves 206, 208 support an inner diameter and an outer diameter of the PCB 186.

The PCB 186 may be used to provide power to actuate the electronically controlled valves 114 of the valve assembly 108. For example, each electronically controlled valve 114 may be a two position valve which has a different flow area in each of the two positions. Each electronically controlled valve 114 is electrically coupled to the PCB 186. For example, the coils 148 of the coil assembly 142 are electrically coupled to the PCB 186.

For a given electronically controlled valve 114, the valve inlet 164 of the electronically controlled valve 114 aligns with a respective hole 140 defined by the orifice tube 138 and a respective radial port 130 defined by the lower rod guide 106. The spool 146 moves in a sliding motion in the spool chamber 162. A return spring 210 is disposed within the spool 146. For example, the return spring 210 may be pressed-fit into an opening of the spool 146. The spool 146 is positioned adjacent to the coil 148, such that return spring 210 is positioned between the spool 146 and the coil 148.

When there is no power provided to the coil assembly 142, the damping characteristics will be defined by the flow area of the electronically controlled valve 114 in a first position. The movement of the spool 146 is controlled by supplying power to the coil 148 to move the electronically controlled valve 114 to a second position. The electronically controlled valve 114 can be kept in the second position by continuing to supply power to the coil 148 or by providing means for retaining the electronically controlled valve 114 in the second position and discontinuing the supply of power to the coil 148. The means for retaining the electronically controlled valve 114 in the second position can include mechanical means, magnetic means or other means known in the art.

Once in the second position, movement to the first position can be accomplished by terminating power to the coil 148 or by reversing the current or reversing the polarity of the power supplied to the coil 148 to overcome the retaining means. The amount of flow through the electronically controlled valve 114 has discrete settings for flow control in both the first position and the second position.

It should be understood that when multiple electronically controlled valves 114 are used as part of the valve assembly 108, each electronically controlled valve 114 may have a different flow area in one or both positions. By having a different flow area in one or both positions, the total flow area through the plurality of electronically controlled valves 114 can be set at a specific number of total flow areas depending on the position of each electronically controlled valve. Each electronically controlled valve 114 can have a different flow area, the combinations thereof can determine the total flow area available.

Figure 3:
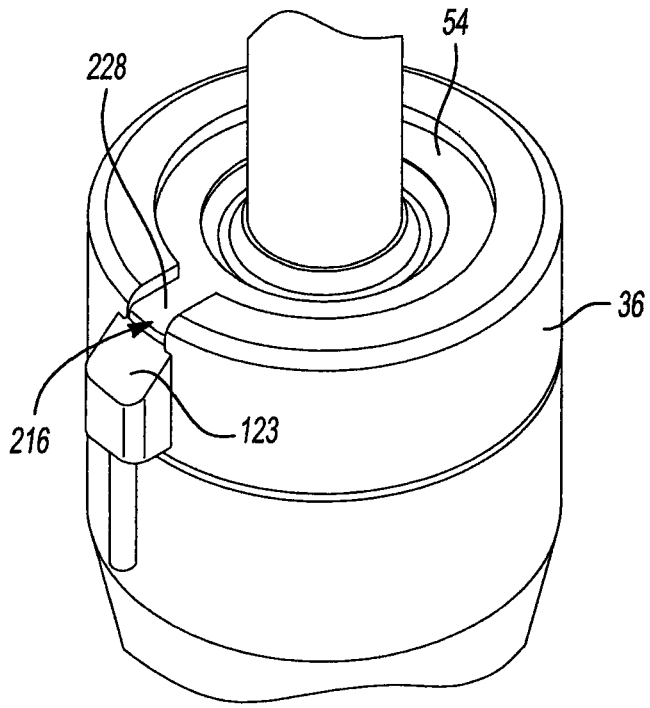
FIG. 3 is an enlarged side view of a rod guide assembly disposed within a reserve tube of the shock absorber.
Figure 4:
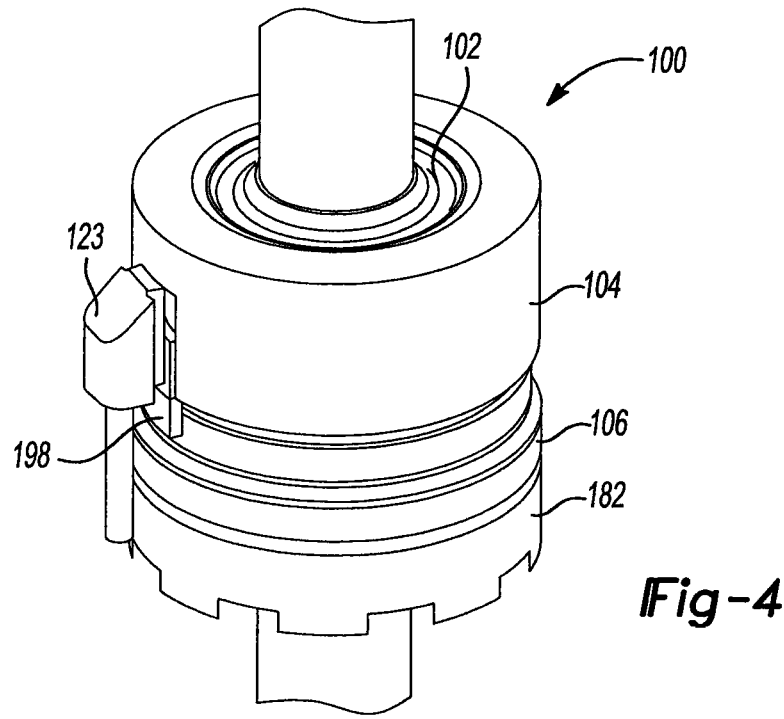
FIG. 4 is an enlarged side view of the rod guide assembly of the shock absorber.

With reference to FIGS. 10 and 11, the wire assembly 123 has a connector 212 which is fixedly coupled to a cable 214. The connector 212 may be, for example, molded onto the cable 214 or molded separately, then bonded to the cable 214. The cable 214 includes multiple wires which are coupled to the PCB 186. The connector 212 is configured to seal to various interfaces such that particles and/or fluids may not enter the shock absorber 20 and fluid may not leak from the shock absorber 20. Specifically, the connector 212 is positioned in the slot 122 of the upper rod guide 104 (FIGS. 4 and 5) and a slot 216 of the reserve tube 36 (FIG. 3). The connector 212 forms a seal around with the load ring 54, the upper rod guide 104, and the reserve tube 36. The connector 212 may include an inner member 218, a middle member 220 and an outer member 222. The inner member 218, the middle member 220 and the outer member 222 form a groove 224 that extends along three sides of the connector 212.

The inner member 218 aligns with the guide tab 198 of the PCB locator 184 and the slot 122 of the upper rod guide 104. The portion of the outer wall 120 of the upper rod guide 104 that forms the slot 122 aligns with a first side 226 of the connector 212 formed by the inner member 218 and the middle member 220. A tab 228 of the load ring 54 is disposed on top of the middle member 220.

The connector 212 interfaces with an inner surface of the reserve tube 36, such that the slot 216 of the reserve tube 36 receives the connector 212 and an edge of the reserve tube 36 that defines the slot 216 aligns within the groove 224 of the connector 212. The outer member 222 of the connector 212 is configured to abut with an outer surface of the reserve tube 36 and extends over the slot 216 of the reserve tube 36.

For ease of manufacturing the rod guide assembly 100, an alignment feature, such as an alignment slot 230 may be defined on the components. For example, the upper rod guide 104, the lower rod guide 106, the coil assembly 142, each of the rings 168, 170, 172 of the valve flow guide 144 and the orifice tube 138, may have an alignment slot 230 to ensure proper orientation of the components with respect to one another. To properly orientate the PCB assembly 112 onto the lower rod guide 106, the PCB locator 184 may include a tab 232 (FIGS. 7 and 15) that aligns with a depression 234 defined on the lower rod guide 106.

Figure 12:
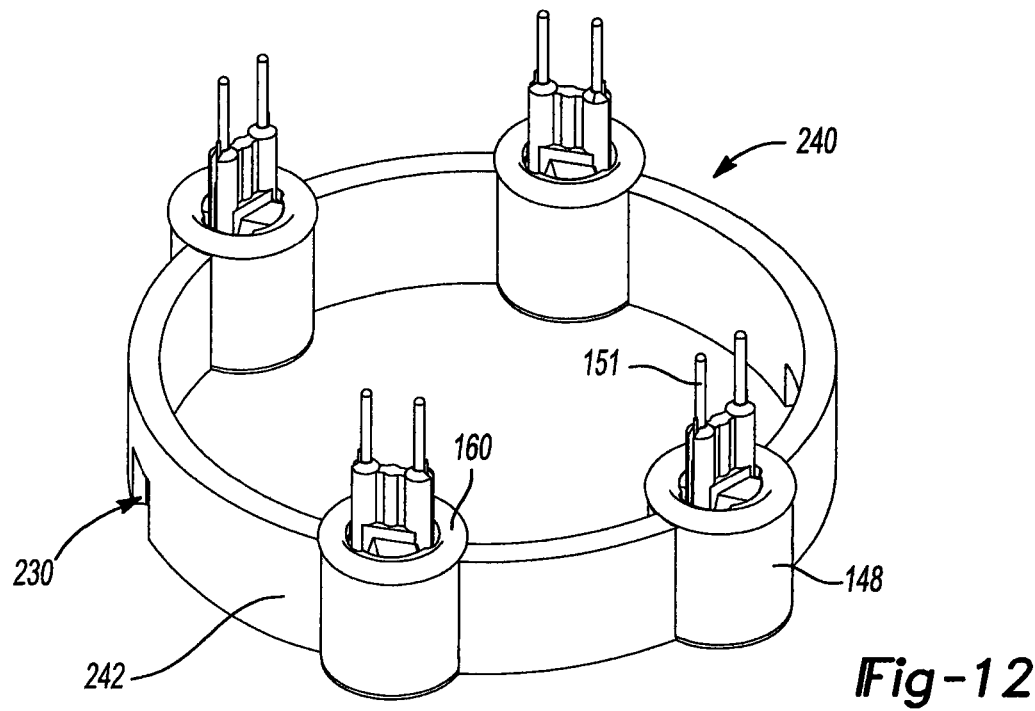
FIG. 12 illustrates a coil assembly having a thin annular body.

In the example embodiment, the coil assembly 142 is depicted as having a thick annular body 150 which substantially encases the coils 148. Alternatively, the valve assembly 108 may include a coil assembly 240 which has an annular body 242, as shown in FIG. 12. The annular body 242 is thinner than the annular body 150 which may reduce the cost of the coil assembly. Both annular bodies 150, 242 align the coils 148 relative to each other and secure the coils 148 in position. Accordingly, the annular body of the coil assembly may be configured in various suitable shapes to align and couple the coils and is not limited to the figures shown herein.

Figure 13A:
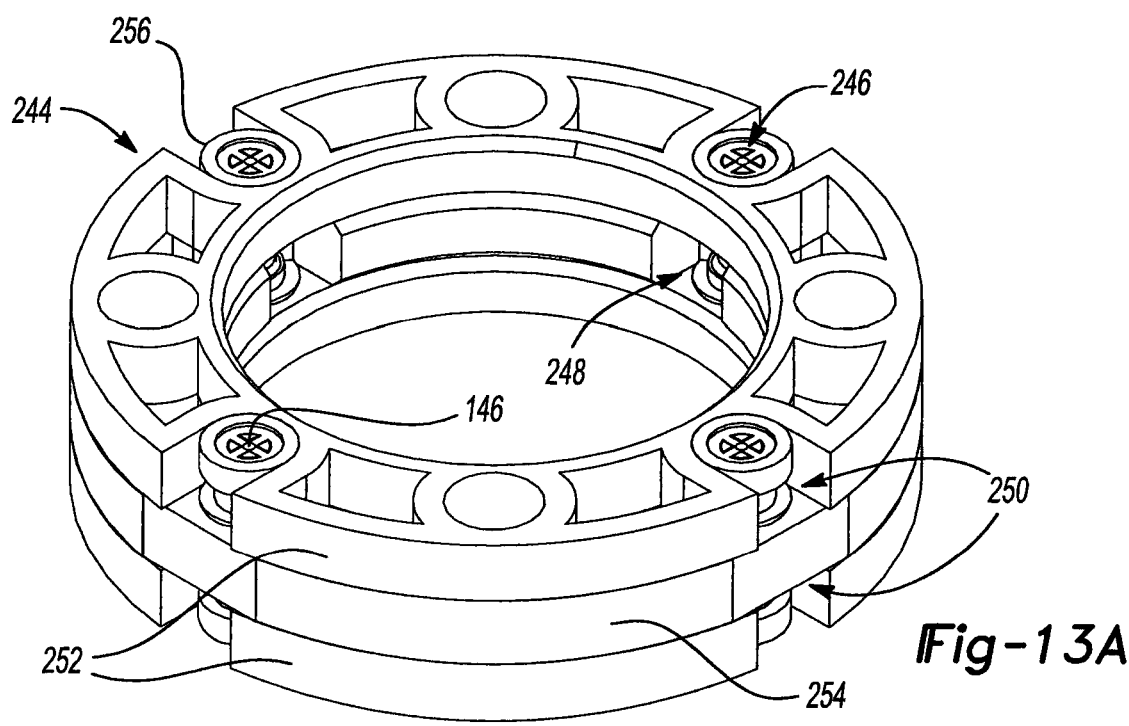

In the example embodiment the valve assembly 108 includes the valve flow guide 144 which includes rings 168, 170, 172. Alternatively the valve assembly 108 may include a valve flow guide 244 shown in FIGS. 13A-13B. The valve flow guide 244 also defines a spool chamber 246, a valve inlet 248, and valve outlet 250. More particularly, the valve flow guide 244 includes at least two valve outlets rings 252, a valve inlet ring 254, and one or more metering sleeves 256. The number of metering sleeves 256 is equal to the number of electronically controlled valves 114. The metering sleeves 256 replace the metering rings 170 of the valve flow guide 144. Similar to the metering rings 170, the metering sleeves 256 have metering edges 257 which align with or overlap with the metering lands 175 of the spool 146 to control the flow of fluid in the open/closed valve positions. The metering sleeves 256 are disposed in the spool chamber 246 defined by the valve outlet rings 252 and the valve inlet ring 254. The metering sleeve 256 may be fixedly coupled to one of the rings 250, 254, such as the valve inlet ring 254 to secure the alignment of the metering sleeve 256 with the valve outlet 250 and the vale inlet 248.

Figure 14:
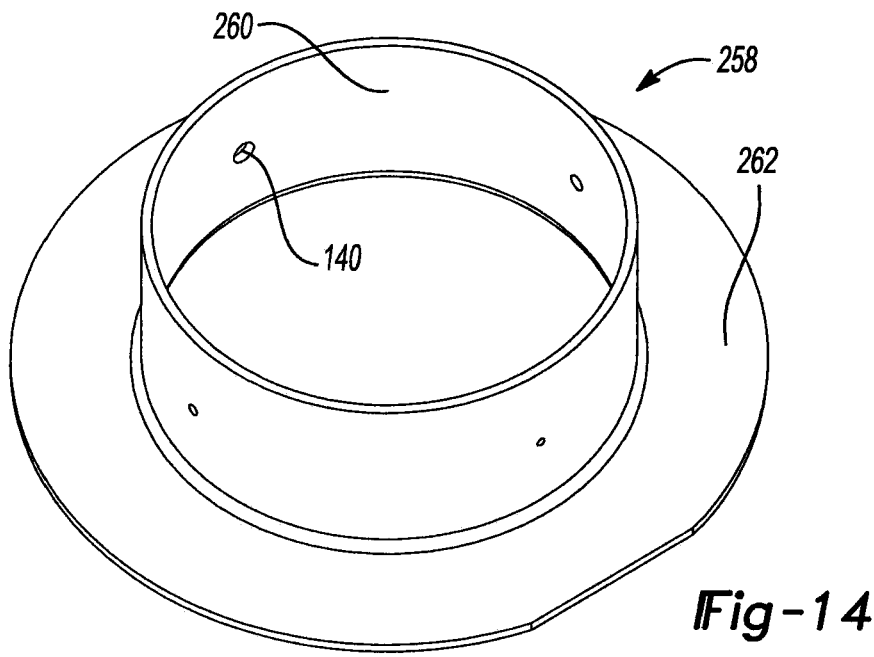
FIG. 14 illustrates an orifice tube.

In the example embodiment, the orifice tube 138 is disposed within the central shaft 126 of the lower rod guide 106. Alternatively, the orifice tube may be arranged on an outer surface of the central shaft 126. For example, with reference to FIG. 14, an orifice tube 258 may be utilized in lieu of the orifice tube 138. The orifice tube 258 defines the holes 140 which align with the radial port 130 of the lower rod guide 106. The orifice tube 258 may have a cylindrical body 260 with an annular plate 262 extending from the cylindrical body 260. The annular plate 262 acts like a stop plate for the spool 146 of the valve assembly 108, thereby removing the need for the stop plate 180. By having the orifice tube 258, the slip ring 136 may be retained within the lower rod guide 106 via a retainer ring. With the orifice tube 258 the outlet reservoir 182 is coupled to the orifice tube 258 in a manner similar to the stop plate 180. For example, the outlet reservoir 182 may be pressed-fit to the orifice tube 258.

Figure 15:
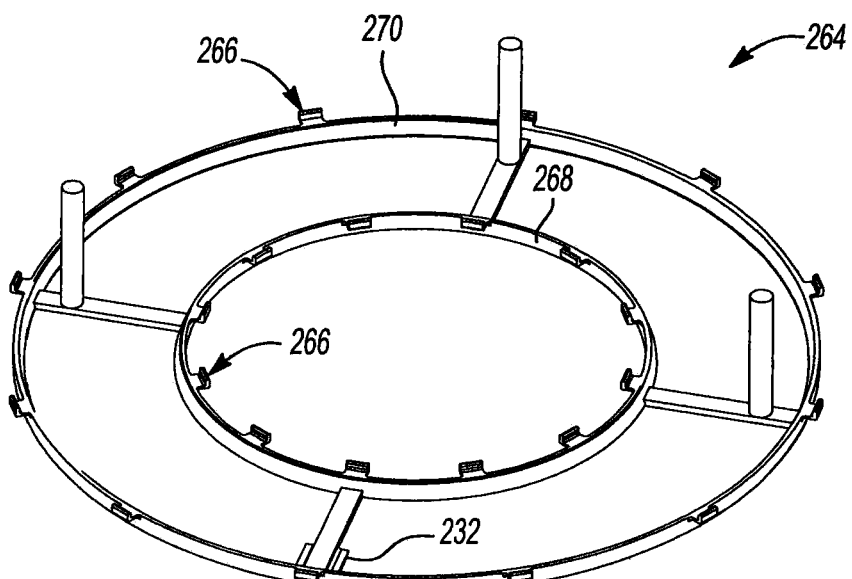
FIG. 15 illustrates a printed circuit board locator which has tabs along its inner and outer diameters.

In the example embodiment, the PCB locator 184 has the inner groove 206 and the outer groove 208 which support the o-rings 202, 204 and the PCB 186. Alternatively, the PCB assembly 112 may include a PCB locator 264 as shown in FIG. 15. The PCB locator 264 has multiple tabs 266 that extend from the inner surface of a first ring 268 and the outer surface of a second ring 270. The tabs 266 support the PCB 186 and isolate the PCB 186 from vibrations. Accordingly, with the PCB locator 264, the PCB assembly 112 may not need o-rings 202, 204.

The rod guide assembly 100 utilizes a multi-piece valve assembly for the electronically controlled valves. More particularly, the valve flow guide eliminates the internally machined grooves for forming the valve inlet, valve outlet and the metering edges, thereby reducing the cost of the electronically controlled valve. Furthermore, the multi-piece valve assembly aligns and couples the coils of the electronically control valves disposed in the shock absorber by way of an annular body formed around the coils. Such a configuration ensures proper alignment of the coils with other component, such as the PCB and the spool.

Figure 16:
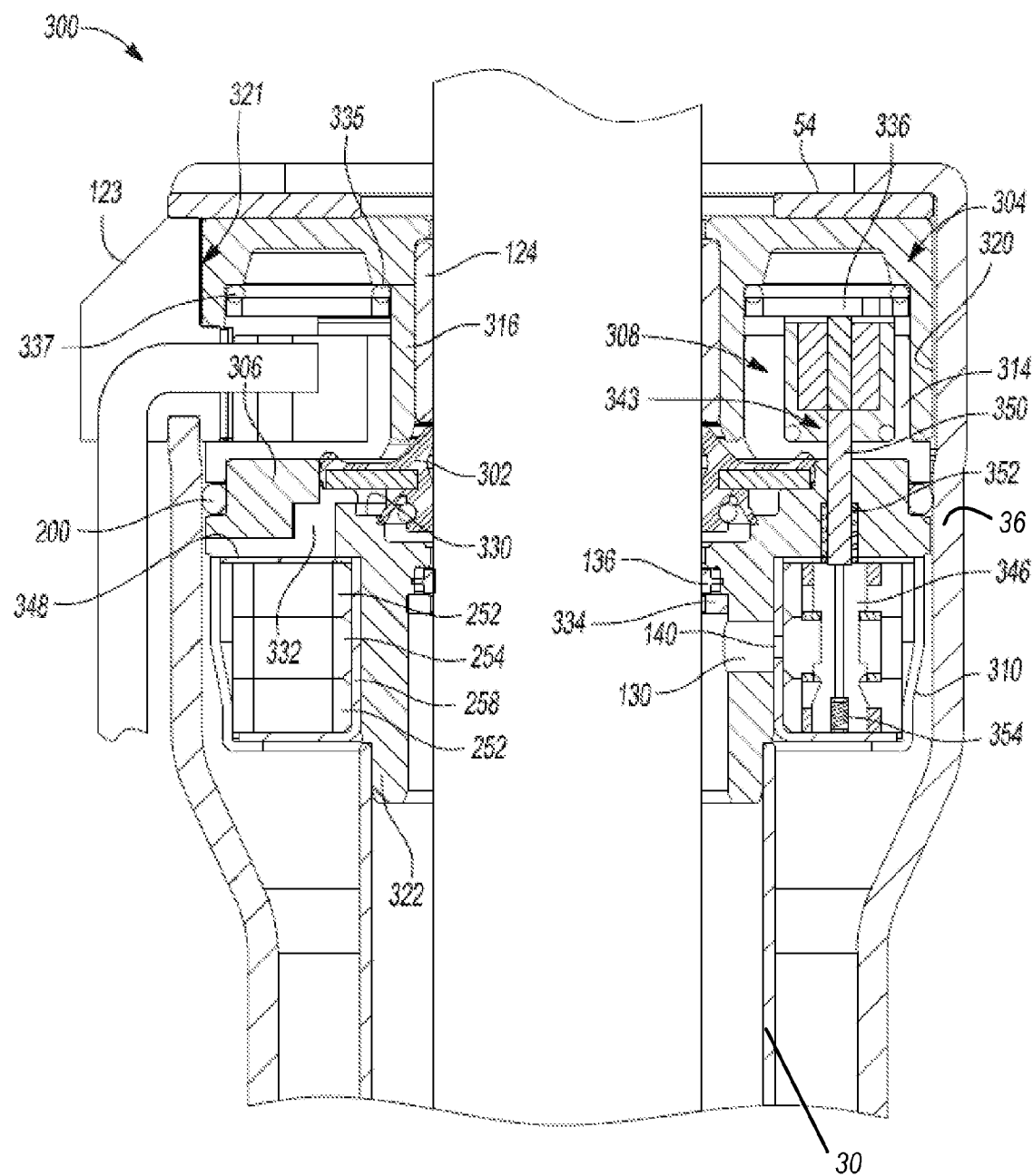
FIG. 16 is an enlarged cross-sectional view of a second example of a rod guide assembly for the shock absorber.
Figure 17:
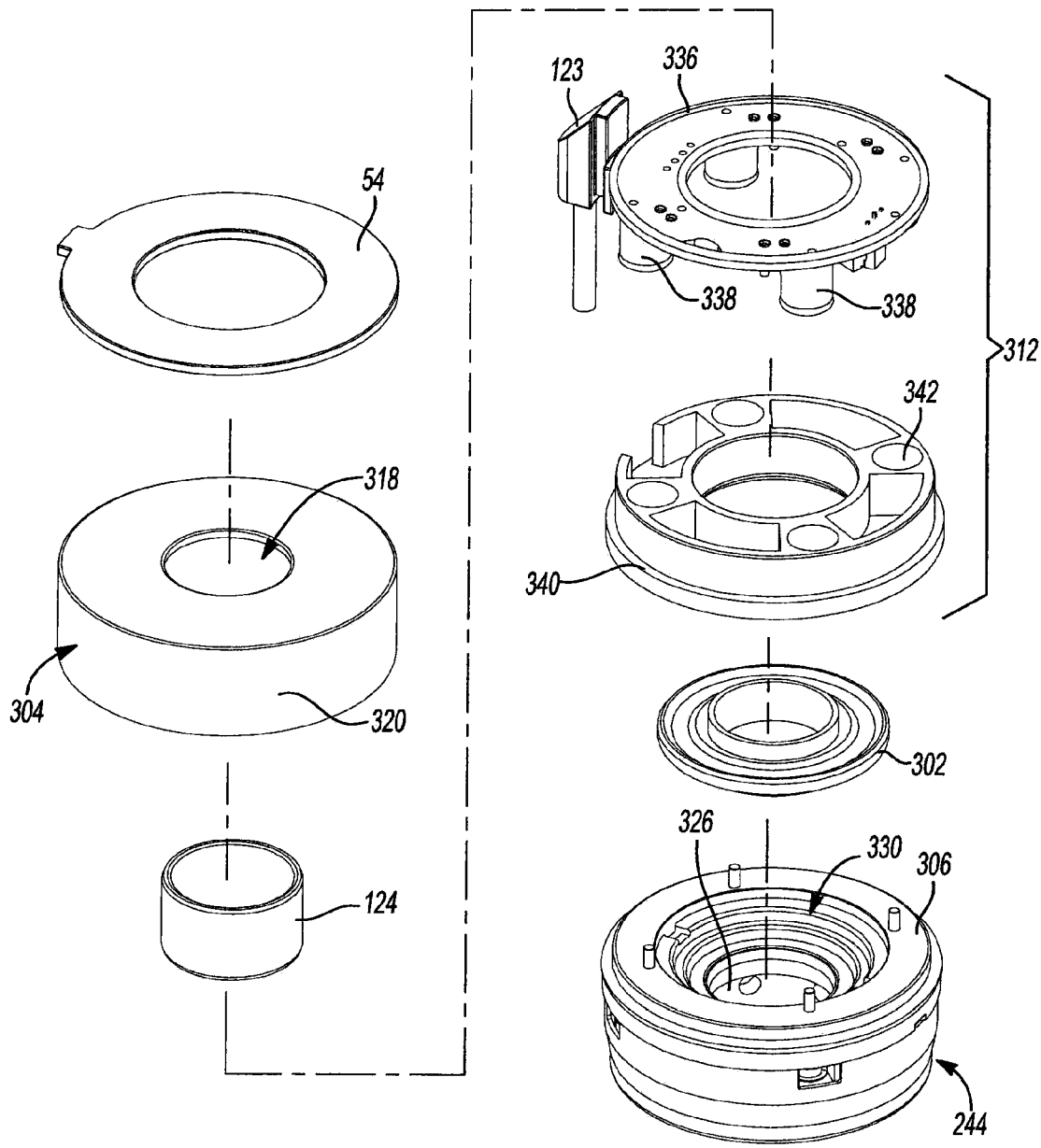
FIG. 17 is an exploded view of the rod guide assembly of FIG. 16.
Figure 18:
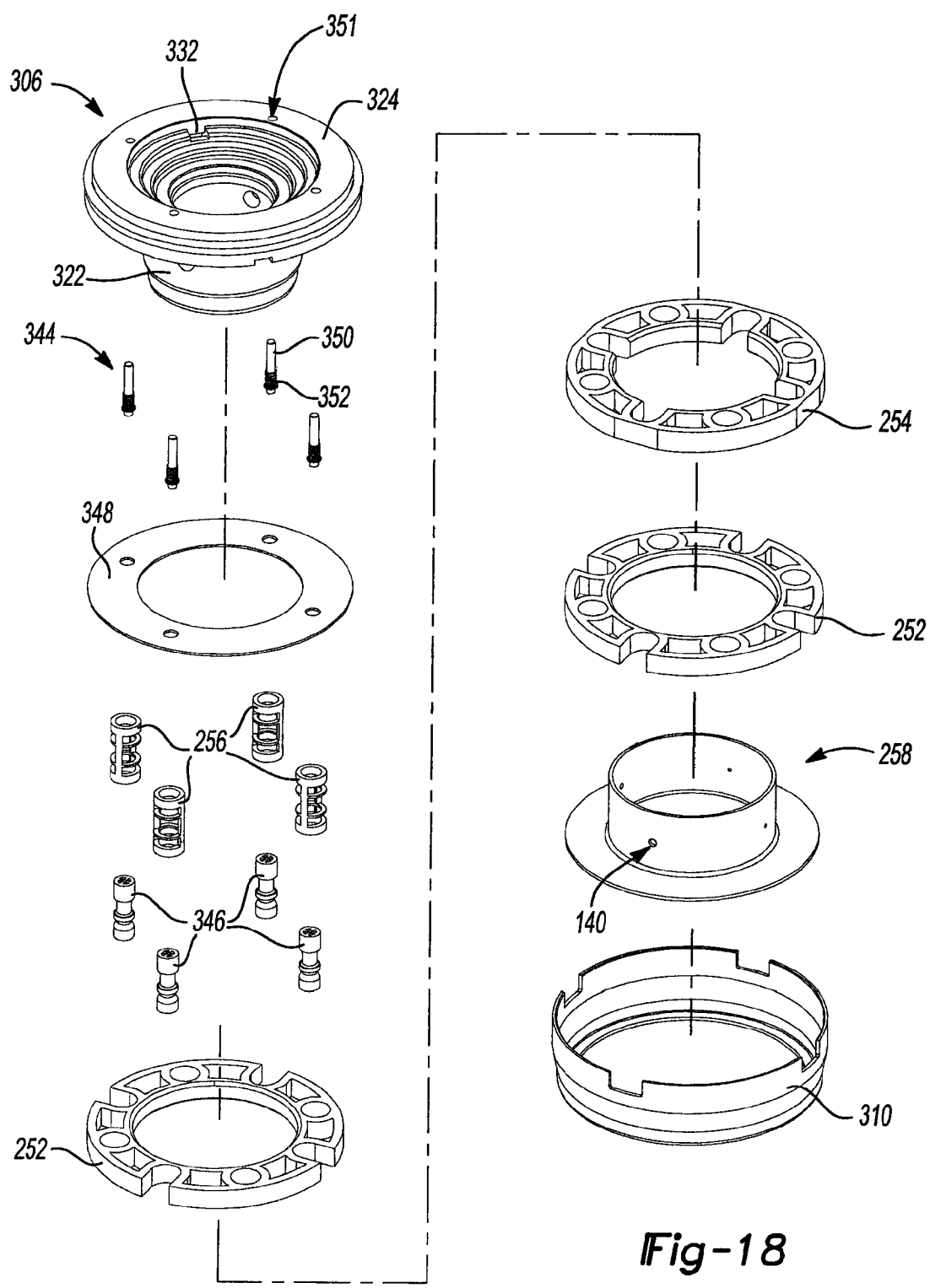
FIG. 18 is an exploded view of a lower rod guide and valve assembly of the rod guide assembly of FIG. 16.

As an alternative to the rod guide assembly 100, the shock absorbers 20, 26 may include a rod guide assembly 300 shown in FIGS. 16-18. Similar to the rod guide assembly 100, the rod guide assembly 300 is disposed within the reserve tube 36 and is secured by the load ring 54. It is readily understood that components having similar names for the various embodiments perform in a similar manner. Accordingly, for purposes of brevity, details regarding such component may not be described again.

The rod guide assembly 300 includes a seal 302, an upper rod guide 304, a lower rod guide 306, a valve assembly 308, and a printed circuit board (PCB) assembly 312. The valve assembly 308 forms one or more electronically controlled valves 314. In the example embodiment, the valve assembly 308 has four electronically controlled valves 314.

The seal 302 is disposed between the upper rod guide 304 and the lower rod guide 306. The upper rod guide 304 may have a body similar to the upper rod guide 104. Specifically, the upper rod guide 304 may have a substantially cylindrical shaped body with a central shaft 316 that defines a central aperture 318. An outer wall 320 of the upper rod guide 304 defines the slot 321 which accommodates the wire assembly 123. The bearing 124 is disposed within the central shaft 316 of the upper rod guide 304.

The lower rod guide 306 has a central shaft 322 with an annular shoulder 324 extending from the central shaft 322. The central shaft 322 defines a central aperture 326 which aligns with the central aperture 318 of the upper rod guide 304. The pressure tube 30 is fixedly coupled to the central shaft 322. The central shaft 322 defines one or more radial ports 130. The annular shoulder 324 of the lower rod guide 306 defines a seal cavity 330 which is concentrically arranged about the central aperture 326 for accommodating the seal 302. The annular shoulder 324 also defines one or more drainback ports 332 that extend from the seal cavity 330 to the outer diameter of the annular shoulder 324. Similar to the drainback passage 156, the drainback port 332 forms a flow path between a chamber formed between the seal 302 and the slip ring 136 to the reservoir chamber 50 of the shock absorber 20, thereby preventing hydraulic fluid from accumulating between the seal 302 and the slip ring 136.

The slip ring 136 and a retainer ring 334 are disposed within the central shaft 322 of the lower rod guide 306. In the example embodiment, the rod guide assembly 300 includes the orifice tube 258, which is arranged along the outer surface of the central shaft 322. Alternatively, the rod guide assembly 300 may include the orifice tube 138. With the orifice tube 138, the retainer ring 334 may be removed. As described above, the orifice tube 258 defines the holes 140 which aligns with the radial port 130 of the lower rod guide 306.

The rod guide assembly 300 further includes the PCB assembly 312. The PCB assembly 312 includes a PCB 336 and the wire assembly 123. The wire assembly 123 is disposed in the rod guide assembly 300 in a similar manner as in the rod guide assembly 100. The PCB 336 further includes one or more coils 338 which are wired directly the PCB 336. The number of coils 338 utilized is equal to the number of electronically controlled valves 314 of the valve assembly 308. Accordingly, in the example embodiment four coils 338 are coupled to the PCB 336. The PCB 336 may be isolated from vibration from the upper rod guide 304 via isolation o-rings 335, 337 which are disposed between the PCB assembly 312 and the upper rod guide 304 along the inner diameter and the outer diameter of the PCB assembly 312, respectively.

The PCB assembly 312 is disposed in a PCB retainer 340 which may be made of metal or plastic. The PCB retainer 340 defines multiple cavities and counter bores for housing the PCB 336. For example, the PCB retainer 340 includes a bore 342 for housing the coil 338. The PCB retainer 340 circumferentially encloses and isolates the PCB assembly 312. The PCB retainer 340 further locates and aligns the wire assembly 123 with the upper rod guide 304, and forms an enclosure between the upper rod guide 304 and the lower rod guide 306. The PCB retainer 340 also interfaces with the seal 302 and retains the o-ring 200 disposed on a surface of the lower rod guide 306.

In the example embodiment, the valve assembly 308 includes one or more solenoid assemblies 343 and one or more spools 346. The solenoid assembly 343 includes the coil 338 and an actuating pin assembly 344. To retain the spools 346 within the valve flow guide 244, a stop plate 348 is disposed between the lower rod guide 306 and the valve flow guide 244. While in the example embodiment the valve assembly 308 utilizes the valve flow guide 244, the valve assembly 308 may alternatively use the valve flow guide 144. Furthermore, the valve flow guide of the rod guide assembly 300 may be made of plastic, ceramic, or a non-magnetic metal.

In the example embodiment four actuating pin assemblies 344 are provided; one for each electronically controlled valve 314. Each actuating pin assembly 344 includes an actuating pin 350 and a returning spring 352. The actuating pin 350 is disposed between the coil 338 and the spool 346. The actuating pin 350 extends through the lower rod guide 306 via an opening 351 defined by the lower rod guide 306. The returning spring 352 is disposed around the actuating pin and is adjacent to the spool 346. The returning spring 352 exerts a force upon the actuating pin 350 to hold the actuating pin 350 down and away from the coil 338. The actuating pin 350 can be made of a magnetic material.

The spool 346 is disposed within the spool chamber 246 of the valve flow guide 244. The spool 346 moves axially within the spool chamber 246 between the stop plate 348 and the orifice tube 258. A push spring 354 is disposed within the spool 346 at an end of the spool 346 opposite from the actuating pin 350. The push spring 354 exerts a force upon the spool 346 such that the spool 346 is continuously contacting the actuating pin 350. The spool 346 can be made of metal or plastic.

Similar to the rod guide assembly 100, the rod guide assembly 300 further includes an outlet reservoir 310, which is arranged around the lower rod guide 306. The outlet reservoir 310 extends substantially up to and around the valve flow guide 244 and is retained by way of the orifice tube 258.

For a given electronically controlled valve 314, when there is no power provided to the coil 338, the damping characteristics will be defined by the flow area of the electronically controlled valves 314 in a first position. The movement of the spool 346 is controlled by the coil 338 and the actuating pin assembly 344. More particularly, the actuating pin assembly 344 is electromechanically actuated by the coil 338 which is in the upper rod guide 304. When power is supplied to the coil 338, the coil 338 generates a magnetic flux field that attracts the actuating pin 350. The actuating pin 350 is displaced until it is adjacent to the coil 338, thereby closing an air gap between the coil 338 and the actuating pin 350. The spool 346 which is in contact with the actuating pin 350 is also displaced, thereby placing the electronically controlled valve 314 in a second position. The electronically controlled valve 314 can be kept in the second position by continuing to supply power to the coil 338 or by providing a means for retaining the electronically controlled valve 314 in the second position and discontinuing the supply of power to the coil 338. The means for retaining the electronically controlled valve 314 in the second position can include mechanical means, magnetic means or other means known in the art.

Once in the second position, movement to the first position can be accomplished by terminating power to the coil 338 or by reversing the current or reversing the polarity of the power supplied to the coil 338 to overcome the retaining means. Once power to coil 338 is removed/reversed, the magnet flux dissipates and the actuating pin is displaced to its original position via the return spring 352. Accordingly, the spool 346 which is continuously in contact with the actuating pin 350 is also displaced to its original position. Both the return spring 352 and the push spring 354 place an axial force on their respective components (i.e., actuating pin 350 and spool 346). The net difference between the axial force is such that the spool 346 remains in the original position when no electrical power is provided to the coil 338. In other words, the electronically controlled valve 314 remains in the first position when no power is supplied to the coil 338.

Figure 19:
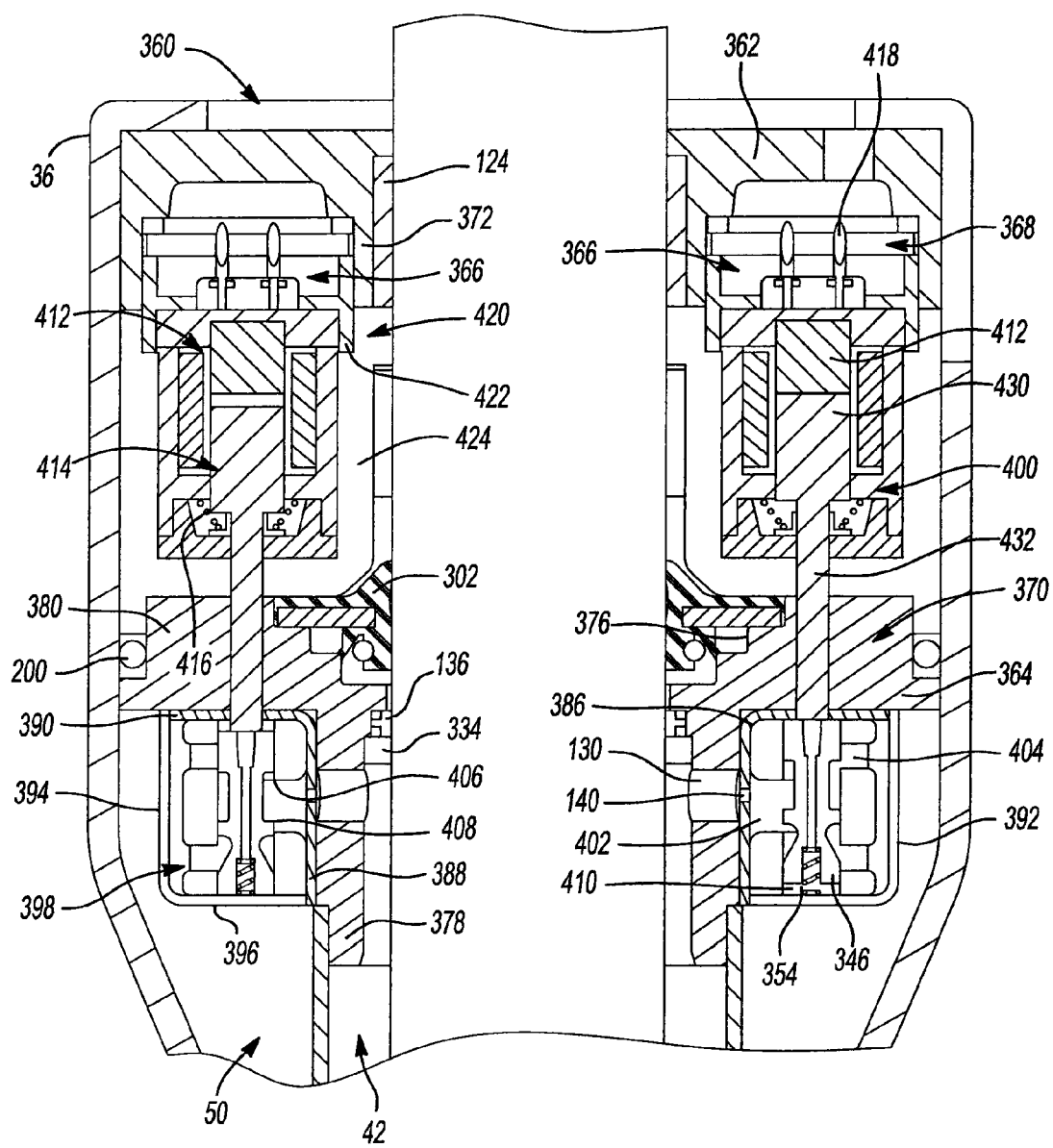
FIG. 19 is an enlarged cross-sectional view of a third example of a rod guide assembly for the shock absorber.

As a variation of the rod guide assembly 300, the shock absorbers 20, 26 may include a rod guide assembly 360. With reference to FIGS. 19 and 20, the rod guide assembly 360 is similar to the rod guide assembly 300 in that the solenoid assembly of the electronically controlled valve is disposed between the upper rod guide and the lower rod guide, and is electronically coupled to the spool via an actuating pin. The rod guide assembly 360 includes a solenoid assembly 400, as described in detail below, in lieu of the solenoid assembly 343 of the rod guide assembly 300.

The rod guide assembly 360 includes an upper rod guide 362, a lower rod guide 364, a valve assembly 366, and a PCB assembly 368. The valve assembly 366 forms one or more electronically controlled valves 370. In the example embodiment, the valve assembly 366 has four electronically controlled valves 370.

Various features described with regard to the rod guide assembly 100 and/or the rod guide assembly 300 may not be represented in FIGS. 19 and 20 for the rod guide assembly 360 for the purpose of brevity. However, it is readily understood that such features are also included in the rod guide assembly 360 even if not shown. For example, it would be readily understood that the PCB assembly 368, includes a PCB, a PCB locator, and a wire assembly.

The upper rod guide 362 has a central shaft 372 which defines a central aperture 374. The bearing 124 is disposed in the central shaft 372. The seal 302 is disposed between the upper rod guide 362 and the lower rod guide 364. Specifically the seal 302 is disposed at a seal cavity 376 defined by the lower rod guide 364.

The lower rod guide 364 has a central shaft 378 with an annular shoulder 380 extending from the central shaft 378. The central shaft 378 defines a central aperture 382 which aligns with the central aperture 374 of the upper rod guide 362. The central shaft 378 defines one or more radial ports 130. The slip ring 136 and the retainer ring 334 are disposed within the central shaft 322 of the lower rod guide 306.

An orifice tube 386 which is similar to the orifice tube 258 is arranged along the outer surface of the central shaft 378 of the lower rod guide 364. The orifice tube 386 defines the holes 140 which align with the radial port 130 of the lower rod guide 364. The orifice tube 386, like the orifice tube 258, has a cylindrical body 388 with an annular plate 390 extending from the cylindrical body 388. The annular plate 390 acts like a stop plate for the spool 346 of the electronically controlled valve 370. Specifically, the orifice tube 386 is arranged such that the annular plate 390 is disposed between the lower rod guide 364 and a valve flow guide 398 of the valve assembly 366.

With the orifice tube 386, the rod guide assembly 362 may utilize an outlet reservoir 392. The outlet reservoir 392 has a cylindrical body 394 with a base 396. The base 396 performs as a stop plate for the spool 346, such that the spool 346 travels between the annular plate 390 of the orifice tube and the base 396 of the outlet reservoir 392. It is readily understood that the rod guide assemblies 100, 300 may be configured to include the outlet reservoir 392 and/or the orifice tube 386. Similarly, the rod guide assembly 362 may be configured to include the outlet reservoir and/or the orifice tube of the rod guide assemblies 100, 300.

The valve assembly 366 includes a valve flow guide 398, one or more solenoid assemblies 400, and spools 346. The valve flow guide 398 defines a valve inlet 402, valve outlets 404, and provides a metering edge 406 for each of the electronically controlled valves 370. The metering edge 406 aligns with metering lands 408 of the spool 346. The valve flow guide 398 further defines a spool chamber 410 which houses the spool 346. The valve inlet 402 aligns with the hole 140 of the orifice tube 386 and the radial port 130 of the lower rod guide 364. The valve flow guide of the rod guide assembly 360 may be made of plastic, ceramic, or a non-magnetic metal.

The solenoid assembly 400 includes a coil 412, an actuating pin 414, and a return spring 416. The coil 412 includes terminals 418 which are electrically coupled to the PCB of the PCB assembly 368. The solenoid assembly 400 is aligned with the PCB assembly 368 and the lower rod guide 364 by way of a retainer 420 which includes a first member 422 and a second member 424. The second member 424 is similar to the PCB retainer 340 of the rod guide assembly 300. More particularly, the second member 424 defines multiple bores 426 for housing the solenoid assembly 400. The second member 424 further forms an enclosure between the upper rod guide 362 and the lower rod guide 364. The second member 424 also interfaces with the seal 302 and retains the o-ring 200 disposed on a surface of the lower rod guide 364.

The first member 422 is disposed over the second member 424. The first member 422 defines a slot 428 through which the terminal 418 of the solenoid assembly 400 extends through. The PCB assembly 368 is disposed over the first member 422. Accordingly, the solenoid assembly 400 is securely positioned between the upper rod guide 362 and the lower rod guide 364 by way of the retainer 420.

The actuating pin 414 has a step down diameter configuration in which a head 430 of the actuating pin 414 has a larger diameter than a body 432 of the actuating pin 414. The head 430 is positioned adjacent to the coil 412 within the solenoid assembly 400. The body 432 extends through the lower rod guide 364 and the orifice tube 368, and abuts with the spool 346. The return spring 416 is disposed around the body 432 and is adjacent to the head 430. The return spring 416 exerts a force upon the actuating pin 414 to hold the actuating pin 414 down and away from the coil 412. The actuating pin 414 can be made of a magnetic material. The spool 346 is continuously contacting the actuating pin 414 by way of the push spring 354.

The solenoid assembly 400 operates in a similar manner as the coil 338 and the actuating pin assembly 344 of the electronically controlled valve 314 of the rod guide assembly 300. More particularly, as part of the electronically controlled valve 370, when power is supplied to the coil 412, the actuating pin 414 is displaced until it is adjacent to the coil 412, thereby closing an air gap between the coil 412 and the actuating pin 414. Accordingly, the spool 346, which is in continuous contact with the actuating pin 414, also displaces, thereby placing the electronically controlled valve 370 in the second position. Once power to the coil 412 is removed/reversed, the magnet flux dissipates and the actuating pin 414 is displaced to its original position via the return spring 416. Accordingly, the spool 346 is also displaced to its original position, thereby placing the electronically controlled valve 370 in the first position.

Similar to the rod guide assembly 100, the rod guide assemblies 300, 360 utilize a multi-piece valve assembly for the electronically controlled valves 314, 370. More particularly, the valve flow guides eliminate the need for high precision internally machined grooves for forming the valve inlet, the valve outlet and the metering edges, thereby reducing the cost of electronically controlled valve.

With regard to the rod guide assembly 300, 360, the electronically controlled valve includes a solenoid assembly which is disposed between the upper rod guide and the lower rod guide. The solenoid assembly decouples the magnetic requirements from the hydraulic requirements for the subcomponents. Specifically, the solenoid assembly optimizes the magnetic requirements designed to translate axial motion to the spool of the electronically controlled valve. Accordingly, the spool and even the valve flow guide may now be made of an alternative material like plastic, ceramic, or non-magnetic metals. Thus, the cost of the rod guide assembly 300, 360 may be reduced.

The solenoid assembly further optimizes the magnetic flux path to achieve the desired peak and hold currents to move the actuating pin. The entire magnetic flux may be contained within the solenoid assembly. Thus, the retainer which holds the solenoid assembly may be made of metallic or non-metallic materials, thereby reducing the cost of the rod guide assembly.

Furthermore, by having the seal 302 disposed between the upper rod guide and lower rod guide, the drainback passage (i.e., drainback port 332) is simplified in comparison to the drainback passage 156 of the rod guide assembly 100. The drainback passage of the rod guide assembly 300 shown in FIG. 16 can be formed using axial motion of a manufacturing tool, whereas the drainback passage 156 of the rod guide assembly 100 required cross-drilled holes which adds cost to the lower rod guide.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, and devices to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, and/or components, but do not preclude the presence or addition of one or more other features, elements, components, and/or groups thereof.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A shock absorber comprising:
a piston rod;
a first rod guide member concentrically disposed about the piston rod;
a second rod guide member concentrically disposed about the piston rod and adjacent the first rod guide member; and
an electronically controlled valve assembly including:
a coil assembly having at least one coil fixedly disposed along an annular member, and
a valve guide assembly disposed adjacent the coil assembly and concentrically disposed about the second rod guide member, the valve guide assembly includes a spool and defines a valve inlet, a valve outlet, and a chamber, the spool is disposed within the chamber and controls the flow of fluid between the valve inlet and the valve outlet; wherein
the valve guide assembly includes a plurality of valve rings, the plurality of valve rings are concentrically disposed about the second rod guide member and define the valve inlet, the valve outlet, and the chamber; the shock absorber further comprising:
multiple metering discs having an annular profile and a metering edge,
wherein the metering discs are disposed between the plurality of valve rings, such that the metering discs are adjacent to the valve outlet and the valve inlet and align with a metering land of the spool.

2. The shock absorber of claim 1 further comprising:
a printed circuit board assembly disposed between the first rod guide member and the second rod guide member, wherein the printed circuit board assembly is electrically coupled to the coil assembly.

3. The shock absorber of claim 1 further comprising:
an outlet reservoir retaining hydraulic fluid, wherein the valve guide assembly is substantially disposed within the outlet reservoir such that fluid retained in the outlet reservoir substantially encompasses the valve outlet and the valve inlet.

4. The shock absorber of claim 1 wherein
the second rod guide member includes a central shaft and a plate extending radially from the central shaft, and
the coil assembly abuts with the plate of the second rod guide member.

5. The shock absorber of claim 1 further comprising:

a stop plate, wherein the stop plate is disposed adjacent to the electronically controlled valve assembly, such that the spool travels axially between the stop plate and the coil assembly.

6. A shock absorber comprising:

a piston rod;

a first rod guide member concentrically disposed about the piston rod;

a second rod guide member concentrically disposed about the piston rod and adjacent the first rod guide member; and an electronically controlled valve assembly including:

a coil assembly having at least one coil fixedly disposed along an annular member, and a valve guide assembly disposed adjacent the coil assembly and concentrically disposed about the second rod guide member, the valve guide assembly includes a spool and defines a valve inlet, a valve outlet, and a chamber, the spool is disposed within the chamber and controls the flow of fluid between the valve inlet and the valve outlet; wherein the valve guide assembly includes a metering sleeve disposed within the chamber with the spool, wherein the metering sleeve has metering edges that align with a metering land of the spool to control the flow of fluid between the valve inlet and the valve outlet.

7. The shock absorber of claim 6 further comprising:

a printed circuit board assembly disposed between the first rod guide member and the second rod guide member, wherein the printed circuit board assembly is electrically coupled to the coil assembly.

8. The shock absorber of claim 6 further comprising:

an outlet reservoir retaining hydraulic fluid, wherein the valve guide assembly is substantially disposed within the outlet reservoir such that fluid retained in the outlet reservoir substantially encompasses the valve outlet and the valve inlet.

9. The shock absorber of claim 6 further comprising:

a stop plate, wherein the stop plate is disposed adjacent to the electronically controlled valve assembly, such that the spool travels axially between the stop plate and the coil assembly.

* * * * *